(12) United States Patent
Kubo et al.

(10) Patent No.: US 8,646,925 B2
(45) Date of Patent: Feb. 11, 2014

(54) SOLAR SIMULATOR

(75) Inventors: Nobuhiko Kubo, Tokyo (JP); Kuniaki Takahashi, Kanagawa (JP)

(73) Assignees: Yamashita Denso Corporation, Tokyo (JP); Holonix International Co., Ltd., Kanagawa (JP)

( * ) Notice: Subject to any disclaimer, the term of this patent is extended or adjusted under 35 U.S.C. 154(b) by 0 days.

(21) Appl. No.: 13/583,776

(22) PCT Filed: Mar. 14, 2011

(86) PCT No.: PCT/JP2011/055881
§ 371 (c)(1),
(2), (4) Date: Sep. 10, 2012

(87) PCT Pub. No.: WO2011/115030
PCT Pub. Date: Sep. 22, 2011

(65) Prior Publication Data
US 2013/0003341 A1    Jan. 3, 2013

(30) Foreign Application Priority Data
Mar. 16, 2010 (JP) .................. 2010-059788

(51) Int. Cl.
*F21V 8/00* (2006.01)
*F21V 7/00* (2006.01)

(52) U.S. Cl.
USPC ............ 362/1; 362/296.1; 362/551; 362/268; 362/355

(58) Field of Classification Search
USPC ............ 362/1, 268, 296.1, 307, 311.12, 551, 362/554, 351, 355, 356, 360
See application file for complete search history.

(56) References Cited

U.S. PATENT DOCUMENTS

| | | | | |
|---|---|---|---|---|
| 3,247,367 A | * | 4/1966 | Rayces | 362/241 |
| 6,527,411 B1 | * | 3/2003 | Sayers | 362/245 |
| 8,016,439 B2 | * | 9/2011 | Igari | 362/1 |

FOREIGN PATENT DOCUMENTS

| | | |
|---|---|---|
| JP | 11-214165 | 8/1999 |
| JP | 2003-028785 | 1/2003 |
| JP | 2007-095484 | 4/2007 |
| JP | 2007-250489 | 9/2007 |
| JP | 2008-282663 | 11/2008 |
| JP | 2009-103535 | 5/2009 |
| JP | 2010-27826 | 2/2010 |

OTHER PUBLICATIONS

Japanese Office Action (2).

* cited by examiner

*Primary Examiner* — Thomas Sember
(74) *Attorney, Agent, or Firm* — Frommer Lawrence & Haug LLP

(57) ABSTRACT

A solar simulator includes a light source, an optical reflection element positioned behind the light source to reflect light emitted from the light source in a form of pseudo parallel light, a low-angle light-diffusion optical element for diffusing the reflected light from the optical reflection element at a low diffusion angle, and a parallel light conversion optical element including a number of air holes arranged in parallel rows and provided with faculties for transmitting incident light parallel to the axis of the air holes to absorb or attenuate nonparallel incident light. The parallel light conversion optical element converts the incident light from the low-angle light-diffusion optical element to parallel light and emits the converted parallel light.

28 Claims, 16 Drawing Sheets

SOLAR SIMULATOR

FIELD OF THE INVENTION

The present invention relates to a solar simulator for generating pseudo solar light having a spectral distribution close to that of natural sunlight to irradiate the generated light to an irradiation object to be irradiated.

BACKGROUND ART

There has been known a solar simulator for measuring photoelectric transfer characteristics by irradiating an irradiation object that takes advantage of solar energy, such as a solar panel, with pseudo solar light artificially generated, or for performing deterioration characteristic test on the irradiation object.

PATENT LITERATURE 1 discloses a pseudo solar light irradiation device for irradiating a measuring object with pseudo solar light produced by passing light originated from a xenon lamp through an optical filter and then by diffusely reflecting the light from the filter by a reflector.

PATENT LITERATURE 2 discloses another pseudo solar light irradiation device for irradiating an irradiation object with pseudo solar light produced by passing light originated from an elongated xenon flash lamp through a cylindrical spectral conversion filter arranged in coaxial with the lamp, by reflecting the light from the filter by a reflector, and by diffusing the light reflected by a light diffusing element.

PRIOR TECHNICAL LITERATURE

Patent Literature

PATENT LITERATURE 1: Japanese Unexamined Patent Publication No. 2003-028785A
PATENT LITERATURE 2: Japanese Unexamined Patent Publication No. 2008-282663A

SUMMARY OF INVENTION

Technical Problem

The conventional pseudo solar light irradiation devices as described in PATENT LITERATURE 1 and PATENT LITERATURE 2 make use of diffused light as pseudo solar light to be irradiated onto the irradiation object, but not parallel light at all.

A solar cell element known as of a concentration type has recently attracted attention in the field of a solar battery for instance. The concentration-type solar cell element is placed about a focal point to which natural sunlight is concentrated, so that the sunlight can be converted into electrical energy with high efficiency under high temperature with the potentiality of achieving a high photoelectric conversion efficiency several dozen to several hundred times as large as a conventional silicon solar panel and a thin-film solar panel.

There has not ever existed a solar simulator capable of evaluating the concentration-type solar cell element of this new kind by irradiation of pseudo solar light. That is to say, the solar simulator of this type is required to:
(1) finalize measurement with a flashlight in a split-second (several milliseconds to several hundred milliseconds) in order to perform I-V characteristic evaluation of a solar panel getting larger within a short time;
(2) adjust the spectrum of the pseudo solar light to the Japanese Industrial Standard or the International Electrotechnical Commission (IEC) and the American Society for Testing and Materials (ASTM); and
(3) shorten a distance between the solar panel and a light source of the solar simulator (to about 10 to 30 centimeters) in order to downsize the simulator for allowing installation in a factory with functions of producing pseudo solar light with a high degree of parallelism and irradiating uniform pseudo solar light from up close.

However, under the conventional technology in this field, there could not be manufactured such a device capable of emitting pseudo solar light with a high degree of parallelism by use of a light source producing flash pulse lights and sufficing optical uniformity of the pseudo solar light emitted at close range. This reason comes from the following facts:
(A) a xenon flash lamp used as a light source is a straight tube lamp, but not a point light source;
(B) the xenon light source of this type may be used singularly, but there is a case where a plurality of xenon light sources are used. The later is very complicated specifically in optical system, thus to complicate the design for the optical system to obtain light with a high degree of parallelism and exceptionally increase the cost of manufacturing; and
(C) a solar panel evaluation device is required to emit light having a spectrum adjusted to accommodate the international standards. In other words, it is required that light to be offered is maintained at a high degree of parallelism at the time of entering the solar panel from the straight tube type xenon flash lamp and has very little chromatic aberration in a very broad range of spectrum. Although the latest lens design technique can realize such requirements, it requires extraordinary cost that is far from a permissible manufacturing cost.

It is therefore an object of the present invention to provide a solar simulator capable of irradiating light with a high degree of parallelism and high optical uniformity from close range.

It is another object of the present invention to provide a solar simulator capable of manufacturing with low cost.

Means to Solve the Problem

According to the present invention, provided is a solar simulator including a light source, an optical reflection element positioned behind the light source to reflect light emitted from the light source in a form of pseudo parallel light, a low-angle light-diffusion optical element for diffusing the reflected light from the optical reflection element at a low diffusion angle, and a parallel light conversion optical element including a number of air holes arranged in parallel rows and provided with faculties for transmitting incident light parallel to the axis of the air holes to absorb or attenuate nonparallel incident light. The parallel light conversion optical element converts the incident light from the low-angle light-diffusion optical element to parallel light and emits the converted parallel light.

The light from the light source is reflected by the optical reflection element to make pseudo parallel light, emitted to an irradiation object after being diffused at a low diffusion angle by the low-angle light-diffusion optical element and converted to the parallel light by the parallel light conversion optical element. The parallel light conversion optical element is formed by arranging a number of air holes in parallel rows, which serve to transmit the incident light parallel to the axis of the air holes to absorb or attenuate the nonparallel incident light, so that the light can be converted to have a high degree of parallelism. Besides, the low-angle light-diffusion optical element for diffusing the light at a low diffusion angle is arranged in the preceding stage of the parallel light conversion optical element, so that the light exiting from the parallel light conversion optical element can extremely increase in degree of parallelism. Consequently, the parallel light becomes uniform as if it arrives from the infinite point. Moreover, such configuration of the optical reflection element, the low-angle light-diffusion optical element and the parallel light conversion optical element, through which the light from the light source pass sequentially, makes it possible to reduce the overall size of the solar simulator even when using a light source such as a xenon flash lamp capable of emitting flash pulse light having a suitable spectrum, and further require no complicated optical system, consequently to reduce manufacturing cost.

It is preferred that an exit plane of the low-angle light-diffusion optical element is in contact with an incidence plane of the parallel light conversion optical element, and that the low-angle light-diffusion optical element is adapted to diffusely reflect an incidence light from the parallel light conversion optical element at its surface. The low-angle light-diffusion optical element is located behind the parallel light conversion optical element as viewed from the irradiation object so that the light is diffusely reflected by the surface of the low-angle light-diffusion optical element even if return light reflected by the irradiation object passes through the parallel light conversion optical element in the reverse direction. Thus, even if the light is reflected by the surface of the low-angle light-diffusion optical element and again enters the parallel light conversion optical element, the light is partly absorbed by the inner wall of the parallel light conversion optical element without causing a disadvantage of being brought to the irradiation object. The low-angle light-diffusion optical element and the parallel light conversion optical element are in contact with each other, thereby to further improve the diffusion effect of the low-angle light-diffusion optical element in regard to the return light.

It is also preferred that the low diffusion angle of the low-angle light-diffusion optical element corresponds to FWHM (Full Width Half Maximum) value from 0.5 to 5 degrees. The degree of diffusion of the low-angle light-diffusion optical element in regard to the transmitted light and the reflected light is made within the aforementioned angular range, so that the parallel light component can enter the air holes in the parallel light conversion optical element as much as possible.

It is further preferred that the parallel light conversion optical element includes an air-pipe optical element including a number of air pipes arranged in parallel rows and provided with faculties for allowing incident light parallel to the axis of the air holes to be transmitted there through and nonparallel incident light to be absorbed, and that an incident light from the low-angle light-diffusion optical element is converted to parallel light and the converted parallel light is emitted. Since the parallel light conversion optical element serves to absorb the nonparallel incident light with respect to the axis of the pipes in the air pipes, only the light with very high degree of parallelism can be emitted.

In this case, preferably a surface on a light exit side of the air-pipe element is configured by a light-absorbing rough surface. This prevents that the return light from the surface of the irradiation object is reflected by the surface of the light exit side of the air-pipe optical element to enter again the irradiation object. Thus, inconvenience such as measurement errors can be reduced.

Further, it is preferred that a light-absorptive material is filled between adjacent air pipes of the air-pipe optical element. This makes it possible to materially increase the properties for absorbing nonparallel light with respect to the pipe axis, thus to entirely eliminate cross talk between the pipes.

It is preferred that the parallel light conversion optical element includes a honeycomb optical element including a number of honeycomb air holes arranged in parallel rows and provided with faculties for transmitting incident light parallel to an axis of the air holes to attenuate nonparallel incident light, and that an incident light from the low-angle light-diffusion optical element is converted to parallel light and the converted parallel light is emitted. Since the parallel light conversion optical element serves to attenuate the nonparallel light with respect to the axis of the air holes by diffusely reflecting the light in the honeycomb air holes, light with a somewhat high degree of parallelism can be emitted. Besides, the large-size honeycomb optical element of this kind is available at low cost, thereby to dramatically reduce the cost of manufacturing the device.

It is further preferred that the solar simulator further includes a property adjusting optical element arranged in contact with a surface on a light source side of the low-angle light-diffusion optical element to adjust spectral distribution property of the light from the light source and the optical reflection element. With insertion of the property adjusting optical element, the spectral distribution conforming to the international standard can easily be obtained. Specifically, the contact between the property adjusting optical element and the surface of the low-angle light-diffusion optical element can prevent an optical loss (Fresnel loss) from being caused at the contact point.

It is still further preferred the solar simulator further includes a property adjusting optical element arranged in contact with a surface opposite to a surface of a light source side of the parallel light conversion optical element to adjust spectral distribution property of the light from the light source and the optical reflection element. By inserting the property adjusting optical element and converting incident light from the property adjusting optical element to exit light emitted from the parallel light conversion optical element with a high degree of parallelism, the spectral distribution exactly conforming to the international standard can easily be obtained.

It is further preferred that the solar simulator further includes a light diffusing optical element for adjusting light intensity distribution, arranged between the optical reflection element and the low-angle light-diffusion optical element to adjust the light intensity distribution of the reflected light applied from the optical reflection element to the low-angle light-diffusion optical element. By arranging such light diffusing optical element for adjusting light intensity distribution, it is possible to uniform peak intensity distribution of the applied light reflected by the optical reflection element to some extent. That is, the light from the optical reflection element has the highest light intensity at its center and becomes weaker as closing to peripheral portion of the optical reflection element. Thus, the low-angle light-diffusion optical element with a large diffusion angle at its center and a small diffusion angle at its periphery can uniformly adjust the peak intensity distribution of the light. Besides, adjustment carried out with difference in diffusion angle but not light transmission rate of the low-angle light-diffusion optical element does not cause absorption of the light to prevent reduction of the light energy in the aggregate.

It is further preferred that the optical reflection element includes a reflector having an axial section shaped in a parabola or an approximate parabola, and that the light source is positioned at a focal point of the axial section of the reflector.

It is still further preferred that the solar simulator further includes an additional reflector arranged on a side of the low-angle light-diffusion optical element of the light source to reflect an incident light from the light source toward the optical reflection element, the additional reflector having an axial section shaped in a partially round shape, and that the light source is positioned at a focal point of the axial section of the additional reflector. In this case, preferably a slit is formed in a part on a side of the low-angle light-diffusion optical element of the additional reflector.

It is still further preferred that the optical reflection element includes a reflective surface near the light source, the reflective surface having an axial section formed in a shape of two sides of a triangle projecting toward the light source.

According to the present invention, also, a solar simulator includes a light source, an optical reflection element positioned behind the light source to reflect light emitted from the light source in a form of pseudo parallel light, a first parallel light conversion optical element including a number of air holes arranged in parallel rows and provided with faculties for transmitting incident light parallel to the axis of the air holes to absorb at least a part of nonparallel incident light, the first parallel light conversion optical element converting the incident light from the optical reflection element into parallel light, a low-angle light-diffusion optical element for diffusing the light from the first parallel light conversion optical element at a low diffusion angle, and a second parallel light conversion optical element including a number of air holes arranged in parallel rows and provided with faculties for transmitting incident light parallel to the axis of the air holes to absorb or attenuate nonparallel incident light, the second parallel light conversion optical element converting the incident light from the low-angle light-diffusion optical element to parallel light and emitting the converted parallel light.

The light from the light source is reflected by the optical reflection element to make pseudo parallel light, emitted to an irradiation object after being converted to parallel light by the first parallel light conversion optical element, diffused at a low diffusion angle by the low-angle light-diffusion optical element, and then converted again to the parallel light by the second parallel light conversion optical element. The first parallel light conversion optical element is formed by arranging a number of air holes in parallel rows, which serve to transmit the incident light parallel to the axis of the air holes to absorb or attenuate the nonparallel incident light, so that the light can be converted to have a high degree of parallelism. Also, the second parallel light conversion optical element is formed by arranging a number of air holes in parallel rows, which serve to transmit the incident light parallel to the axis of the air holes to absorb or attenuate the nonparallel incident light, so that the light can be converted to have a high degree of parallelism. Besides, the low-angle light-diffusion optical element for diffusing the light at a low diffusion angle is arranged in the preceding stage of the second parallel light conversion optical element, so that the light exiting from the second parallel light conversion optical element can extremely increase in degree of parallelism. Consequently, the parallel light becomes uniform as if it arrives from the infinite point. Moreover, such configuration of the optical reflection element, the first parallel light conversion optical element, the low-angle light-diffusion optical element and the second parallel light conversion optical element, through which the light from the light source pass sequentially, makes it possible to reduce the overall size of the solar simulator even when using a light source such as a xenon flash lamp capable of emitting flash pulse light having a suitable spectrum, and further require no complicated optical system, consequently to reduce manufacturing cost.

It is preferred that an exit plane of the low-angle light-diffusion optical element is in contact with an incidence plane of the second parallel light conversion optical element, and that the low-angle light-diffusion optical element is adapted to diffusely reflect an incidence light from the second parallel light conversion optical element at its surface. The low-angle light-diffusion optical element is located behind the second parallel light conversion optical element as viewed from the irradiation object so that the light is diffusely reflected by the surface of the low-angle light-diffusion optical element even if return light reflected by the irradiation object passes through the second parallel light conversion optical element in the reverse direction. Thus, even if the light is reflected by the surface of the low-angle light-diffusion optical element and again enters the second parallel light conversion optical element, the light is partly absorbed by the inner wall of the second parallel light conversion optical element without causing a disadvantage of being brought to the irradiation object. The low-angle light-diffusion optical element and the second parallel light conversion optical element are in contact with each other, thereby to further improve the diffusion effect of the low-angle light-diffusion optical element in regard to the return light.

It is also preferred that the low diffusion angle of the low-angle light-diffusion optical element corresponds to FWHM Value of 0.5 to 5 degrees The degree of diffusion of the low-angle light-diffusion optical element in regard to the transmitted light and the reflected light is made within the aforementioned angular range, so that the parallel light component can enter the air holes in the second parallel light conversion optical element as much as possible.

It is further preferred that the first parallel light conversion optical element includes a first air-pipe optical element including a number of air pipes arranged in parallel rows and provided with faculties for allowing incident light parallel to the axis of the air holes to be transmitted there through and nonparallel incident light to be absorbed, that an incident light from the optical reflection element is converted to parallel light and the converted parallel light is emitted, that the second parallel light conversion optical element includes a second air-pipe optical element including a number of air pipes arranged in parallel rows and provided with faculties for allowing incident light parallel to the axis of the air holes to be transmitted there through and nonparallel incident light to be absorbed, and that an incident light from the low-angle light-diffusion optical element is converted to parallel light and the converted parallel light is emitted. Since each of the first parallel light conversion optical element and the second parallel light conversion optical element serves to absorb the nonparallel incident light with respect to the axis of the pipes in the air pipes, only the light with very high degree of parallelism can be emitted.

In this case, preferably surfaces on light exit sides of the first and second air-pipe elements are configured by light-absorbing rough surfaces. This prevents that the return light from the surface of the irradiation object is reflected by the surface of the light exit side of the second air-pipe optical element to enter again the irradiation object. Thus, inconvenience such as measurement errors can be reduced.

Further, it is preferred that a light-absorptive material is filled between the adjacent air pipes of each of the first and second air-pipe optical elements. This makes it possible to materially increase the properties for absorbing nonparallel light with respect to the pipe axis, thus to entirely eliminate cross talk between the pipes.

It is preferred that the first parallel light conversion optical element includes a honeycomb optical element including a number of honeycomb air holes arranged in parallel rows and provided with faculties for transmitting incident light parallel to the axis of the air holes to attenuate nonparallel incident light, that an incident light from the optical reflection element is converted to parallel light and the converted parallel light is emitted, that the second parallel light conversion optical element includes a honeycomb optical element including a number of honeycomb air holes arranged in parallel rows and provided with faculties for transmitting incident light parallel to the axis of the air holes to attenuate the nonparallel incident light, and that an incident light from the low-angle light-diffusion optical element is converted to parallel light and the converted parallel light is emitted. Since the parallel light conversion optical element serves to attenuate the nonparallel light with respect to the axis of the air holes by diffusely reflecting the light in the honeycomb air holes, light with a somewhat high degree of parallelism can be emitted. Besides, the large-size honeycomb optical element of this kind is available at low cost, thereby to dramatically reduce the cost of manufacturing the device.

It is further preferred that the solar simulator further includes a property adjusting optical element arranged in contact with a surface of the low-angle light-diffusion optical element, on a side of the first parallel light conversion optical element, to adjust spectral distribution property of the incident light from the first parallel light conversion optical element. With insertion of the property adjusting optical element, the spectral distribution conforming to the international standard can easily be obtained. Specifically, the contact between the property adjusting optical element and the surface of the low-angle light-diffusion optical element can prevent an optical loss (Fresnel loss) from being caused at the contact point.

It is still further preferred the solar simulator further includes a property adjusting optical element arranged in contact with a surface opposite to the surface of the light source side of the second parallel light conversion optical element to adjust spectral distribution property of the light from the light source and the optical reflection element. By inserting the property adjusting optical element and converting incident light from the property adjusting optical element to exit light emitted from the second parallel light conversion optical element with a high degree of parallelism, the spectral distribution exactly conforming to the international standard can easily be obtained.

It is preferred that the first and second parallel light conversion optical elements have periodic functions different from each other. This serves to prevent emergence of Moire fringes in the exit light to be irradiated onto the irradiation object.

It is preferred that the first and second parallel light conversion optical elements have equal periodic functions, and that the center axis of the air holes in the first parallel light conversion optical element is displaced from the center axis of the air holes in the second parallel light conversion optical element to control a quantity of light incident on an irradiation object. By intentionally forming Moire fringes in the exit light irradiated onto the irradiation object, quantity of transmitted light can be adjusted with the amount of displacement between the center axes of the air holes.

It is further preferred that the solar simulator further includes a light diffusing optical element for adjusting light intensity distribution, arranged between the optical reflection element and the low-angle light-diffusion optical element to adjust the light intensity distribution of the reflected light applied from the optical reflection element to the low-angle light-diffusion optical element. By arranging such light diffusing optical element for adjusting light intensity distribution, it is possible to uniform peak intensity distribution of the applied light reflected by the optical reflection element to some extent. That is, the light from the optical reflection element has the highest light intensity at its center and becomes weaker as closing to peripheral portion of the optical reflection element. Thus, the low-angle light-diffusion optical element with a large diffusion angle at its center and a small diffusion angle at its periphery can uniformly adjust the peak intensity distribution of the light. Besides, adjustment carried out with difference in diffusion angle but not light transmission rate of the low-angle light-diffusion optical element does not cause absorption of the light to prevent reduction of the light energy in the aggregate.

It is further preferred that the optical reflection element includes a reflector having an axial section shaped in a parabola or an approximate parabola, and that the light source is positioned at a focal point of the axial section of the reflector.

It is still further preferred that the solar simulator further includes an additional reflector arranged on a side of the low-angle light-diffusion optical element of the light source to reflect an incident light from the light source toward the optical reflection element, the additional reflector having an axial section shaped in a partially round shape, and that the light source is positioned at a focal point of the axial section of the additional reflector. In this case, preferably a slit is formed in a part on a side of the low-angle light-diffusion optical element of the additional reflector.

It is still further preferred that the optical reflection element includes a reflective surface near the light source, the reflective surface having an axial section formed in a shape of two sides of a triangle projecting toward the light source.

Advantages of the Invention

According to the present invention, since the parallel light conversion optical element is formed by arranging a number of air holes in parallel rows, which serve to transmit the incident light parallel to the axis of the air holes to absorb or attenuate the nonparallel incident light, the light can be converted to the light with a high degree of parallelism. Besides, since the low-angle light-diffusion optical element for diffusing the light at a low diffusion angle is disposed in the preceding stage of the parallel light conversion optical element, the light exiting from the parallel light conversion optical element can extremely increase in degree of parallelism. Consequently, the parallel light becomes uniform as if it arrives from the infinite point. Moreover, the optical reflection element, low-angle light-diffusion optical element and parallel light conversion optical element, through which the light from the light source pass sequentially, make it possible to reduce the overall size of the solar simulator even when using a light source such as a xenon flash lamp capable of emitting flash pulse light having a suitable spectrum, and further require no complicated optical system, consequently to reduce manufacturing cost.

DESCRIPTION OF EMBODIMENTS

Figure 1:
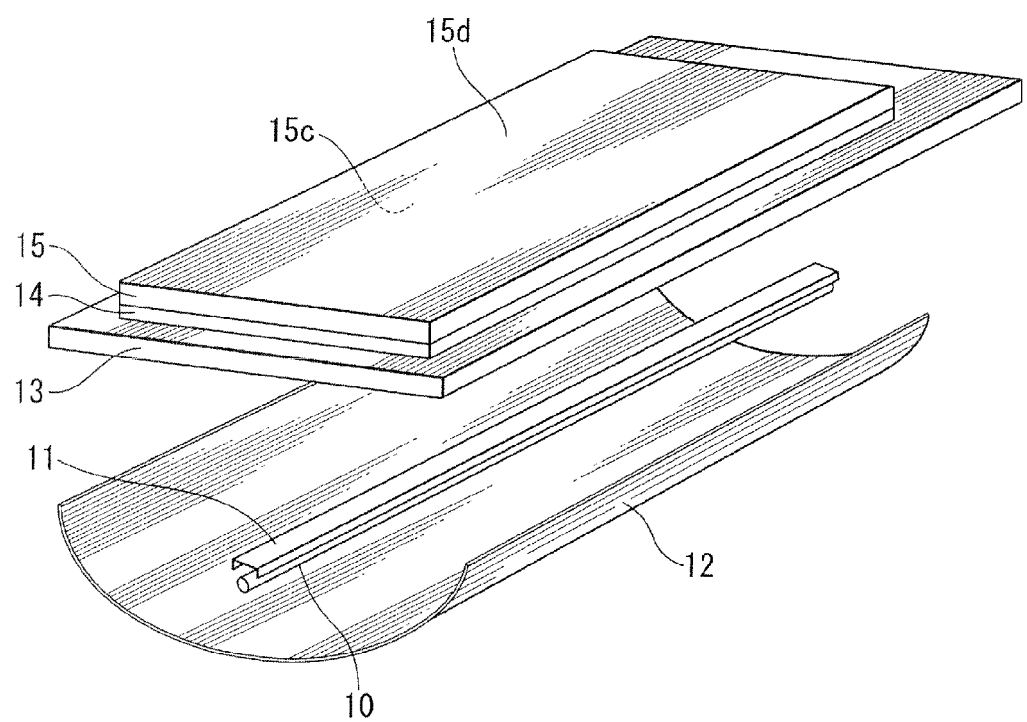
FIG. 1 is a perspective view schematically illustrating configuration of a solar simulator in a first embodiment according to the present invention.
Figure 2:
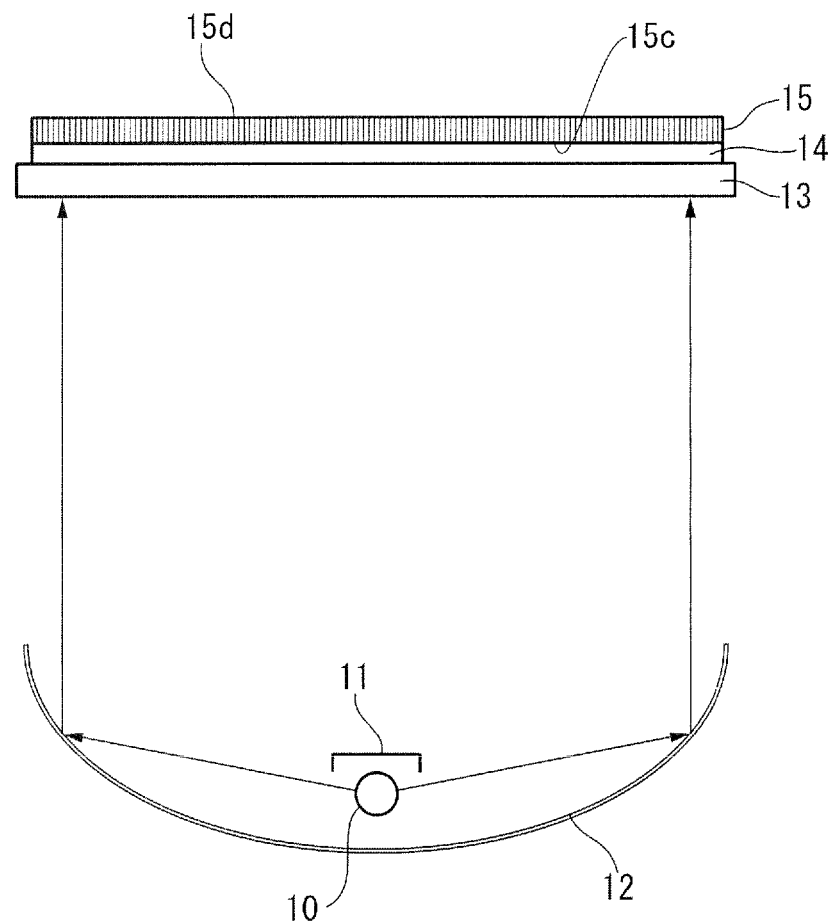
FIG. 2 is a sectional side view schematically illustrating configuration of the solar simulator in the first embodiment.
Figure 3:
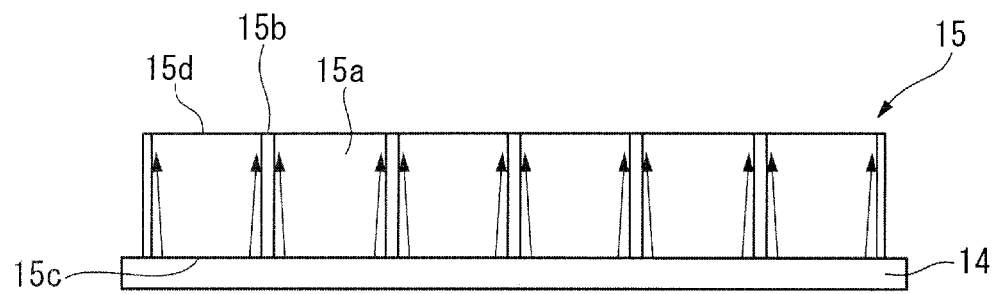
FIG. 3 is a sectional view schematically illustrating partial configurations of a low-angle light-diffusion element and an air-pipe element of the solar simulator in the first embodiment.

FIG. 1 and FIG. 2 schematically illustrate a solar simulator of a first embodiment according to the present invention, and FIG. 3 schematically illustrates partial configurations of a low-angle light-diffusion element and air-pipe element of this embodiment. The solar simulator of this embodiment serves to generate pseudo solar light for evaluating characteristics of a solar panel and to irradiate the solar panel (irradiation object) with the light thus generated.

In these drawings, reference number 10 denotes a straight tube type elongated xenon flash lamp (corresponding to a light source in the present invention), 11 denotes a light-interception cover for blocking direct light irradiated from the xenon flash lamp 10 toward the irradiation object (upward in the drawings), 12 denotes a reflector (corresponding to an optical reflection element in the present invention) disposed behind the xenon flash lamp 10 (downward in the drawings) relative to the irradiation object to reflect light emitted from the xenon flash lamp 10 as pseudo parallel light, 13 denotes a support substrate formed of a transparent glass plate or the like, 14 denotes a low-angle light-diffusion element (corresponding to a low-angle light-diffusion optical element in the present invention) fixed onto the support substrate 13 with an optical adhesive to diffuse the pseudo parallel light from the reflector 12 to exit light with a low diffusion angle of FWHM (Full Width Half Maximum) value from 0.5 to 5 degrees, and 15 denotes an air-pipe element (corresponding to an air-pipe optical element in the present invention) proximately disposed on the low-angle light-diffusion element 14 and composed of a number of air pipes arranged in parallel rows.

The xenon flash lamp 10 of this embodiment is an elongated common xenon lamp of straight tube type capable of generating flashing light with a light emitting pulse width of, for instance, about 5 to 100 msec.

The reflector 12 of this embodiment is elongated in the axial direction of the xenon flash lamp 10 and has an axial section shaped in a parabola. That is, the reflector 12 has a reflection surface of a parabolic mirror or an approximate parabolic mirror. At a focal point of the reflector 12 in the axial section, the xenon flash lamp 10 is placed. The reflector 12 may have a reflection surface with specular-reflection or total reflection, or a somewhat diffused reflection surface.

Figure 4:
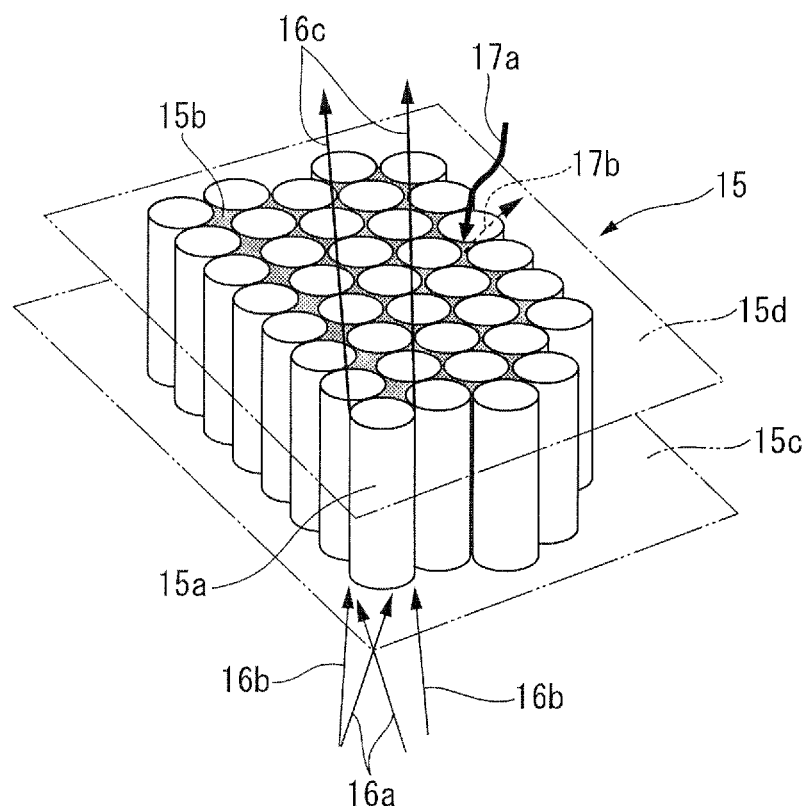
FIG. 4 is a perspective view illustrating structure of the air-pipe element of the solar simulator in the first embodiment.
Figure 5:
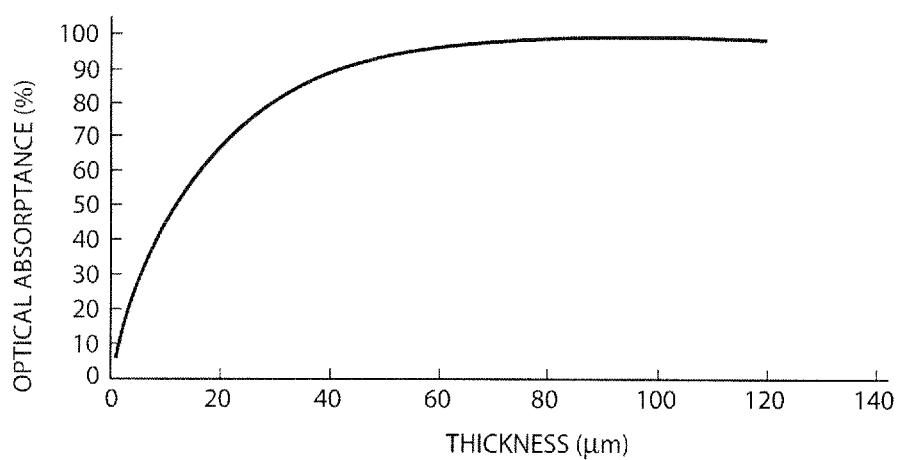
FIG. 5 is a graph showing optical absorption property versus thickness of a light-absorption glass material of the solar simulator in the first embodiment.

The air-pipe element 15 of this embodiment is formed of a large number of air pipes in a black glass plate that absorbs light. The air pipes are linearly arranged in rows parallel to a thickness direction of the glass plate and have a function of transmitting incident light parallel to the axis of the pipes and absorbing nonparallel incident light. Namely, as illustrated in FIG. 3 and FIG. 4, the air-pipe element 15 is provided with many linear air pipes 15a arranged such that their axial directions are linear and parallel to one another. Interior of each air pipe 15a is filled with air. Black light-absorbing glass material 15b is filled into between the air pipes 15a. The light-absorbing glass material 15b constituting the black glass plate is made mainly of glass having a very high optical absorptance, which is capable of absorbing almost 100% of light in an visible region (with a wavelength near 550 nm) in case that its thickness is 60 μm or more as illustrated in FIG. 5. The light-absorbing glass material 15b is a commercially available light-absorptive material, and the air-pipe element 15 configured by the air pipes 15a and the light-absorbing glass material 15b is also available commercially.

Since the light-absorption material serving as the light-absorbing glass material 15b is filled into between the adjacent air pipes 15a, the inner wall surfaces of the respective air pipes 15a as are formed of mirror surfaces can fully absorb the light and completely exclude crosstalk between the pipes. As illustrated in FIG. 4, light 16a obliquely entering into an incidence plane 15c located at the light source side of the black glass plate constituting the air-pipe element 15 is absorbed by the inner surfaces of the air pipes 15a and is not emitted from an exit plane 15d located at the opposite side to the light source. On the other hand, light 16b entering substantially parallel to the axes of the pipes from the incidence plane 15c is emitted in the form of light 16c with a high degree of parallelism out of the exit plane 15d.

By using the black optical material as the light-absorbing glass material 15b, a diffuse light entered into the air pipes 15a can be absorbed with high efficiency. Because each air pipe 15a is formed in a cylindrical shape, the light can be absorbed isotropically and uniformly, and thus uniformity of the exit light can be increased.

The light emitted from the exit plane 15d is irradiated onto the solar panel in the form of light with very high parallelism of ±2 degrees or less. Since 16% to 66% of the total area of the exit plane 15d is formed of the light-absorbing glass material 15b (other area is opening of the air pipes 15a with an opening ratio of 84% to 34%) and the surface of the light-absorbing glass material 15b is kept as a rough surface (with random surface roughness of about 50 μm) quarried by a cutting blade during a glass-hewing process to diffusely reflect the incident light, return or stray light 17a specularly reflected by a surface of the solar panel and entered onto the exit plane 15d largely attenuates by the rough surface. For example, the return or stray light 17a is reflected with a extremely low reflectance value of 0.1% or less in the regions of ultraviolet light, visible light and near-infrared light to produce low reflected return light 17b. Therefore, even if the return or stray light in the form of diffuse light or parallel light enters the exit plane 15d, most of these are attenuated to provide a function of large antireflection, particularly a function of preventing specular reflection. As a result, occurrence of measuring error due to the return or stray light can be almost avoided.

The incidence plane 15c on the light source side of the black glass plate and the exit plane 15d on the other side are made flat and in parallel to each other. These parallel and flat incidence and exit planes are made by performing appropriate polishing resulting occurrence of nonuniformity in parallelism of the light beam emitted from the exit plane 15d due to possible differences length of the air pipes to prevent.

The length of each air pipe 15, i.e. thickness of the black glass plate, is desirably about 2 to 3 mm. The diameter (inner diameter) of each air pipe 15 can be relatively freely selected by controlling the manufacturing process. It is desirable to keep variation in diameter of the air pipes 15 within several percent of error.

Figure 6:
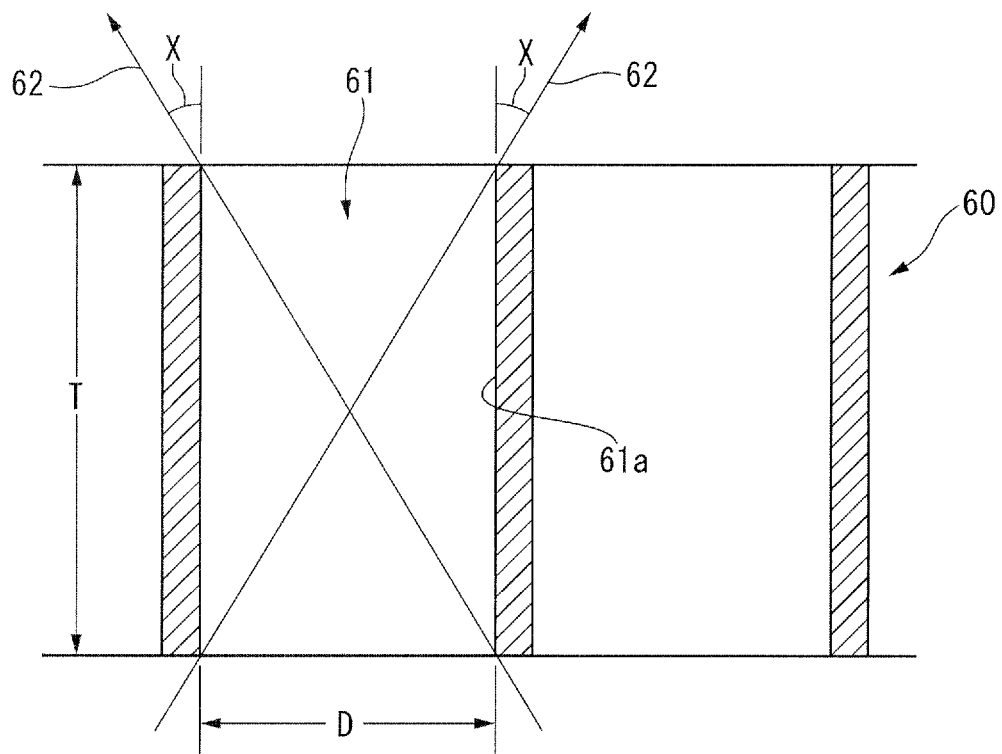
FIG. 6 is a diagram illustrating relationship between diameter and thickness of an air pipe of the air-pipe element of the solar simulator in the first embodiment.

As shown in FIG. 6, the thickness T of the black glass plate 60 is geometrically determined depending on the diameter D of the air pipe 61 and an exit light parallelism X representing a requested exit angle of the exit light 62. In case that the exit light parallelism X is 2 degrees which makes the exit light 62 within ±2 degrees and that the diameter D of the air pipe 61 is D=0.25 mm, the thickness T can be derived from T=D/tan X=7.125 mm because D/T=tan X. Namely, to make the exit light within ±2 degrees, the thickness T of the black glass plate 60 must be 7,125 mm or more. However, it turns out that when so increasing the thickness T of the black glass plate 60, absorbance of light remarkably increases to considerably attenuate the exit light due to exceptionally low reflection coefficient of the inner wall surface 61a of the air pipe 61, consequently to render the device useless. In performing a practical experiment, if the thickness T of the air pipe 61 having a diameter D of 0.25 mm (D=0.25 mm) exceeds 2.5 mm, although the parallelism around a theoretical value can be obtained, attenuation in light is extremely intensified to unpractically decrease the quantity of the light actually emitted. This revealed therefore that it is important to adjust the condition of the incident light entering the air pipe 61 while selecting the thickness T of the black glass plate 60 to 2.5 mm or less. In other words, it is effective to use, as the incident light entering the air pipe 61, scattering or diffuse light having low incident angle rather than scattering or diffuse light having large incident angle, i.e. large scattering angle.

Table 1 represents measurement results actually obtained on the relationships among thickness of the air-pipe element, light transmission rate and parallelism of the exit light with respect to the aforementioned black glass plate (air-pipe element) with an air-pipe diameter D of 0.25 mm and an opening ratio of 84%. In Table 1, the unit of the thickness is mm, the light transmission rate represents a ratio of light intensity of the light exiting when one solar energy light enters the air-pipe element, and the parallelism represents FWHM value (degree). In front of the air-pipe element, a low-angle light-diffusion element which emits exit light having FWHM value of 0.5 degrees is arranged. A low-angle light-diffusion element emitting exit light having FWHM value of 1 degree may be arranged in front of the air-pipe element. It was confirmed that the parallelism somewhat decreased at a position away from the air-pipe element, but it decreased very little at a position near the air-pipe element.

TABLE 1

| Thickness of air-pipe element (mm) | Light transmission rate | Parallelism (FWHM value) (degree) |
| --- | --- | --- |
| 1.5 | 0.85915493 | 2.7405195 |
| 2.0 | 0.77464789 | 2.1610019 |
| 2.2 | 0.73943662 | 1.9931322 |
| 2.4 | 0.70586 | 1.7527696 |
| 2.5 | 0.6888 | 1.6439376 |

Table 1 indicates that sufficient light transmission rate can be obtained when the thickness of the air-pipe element (length of the air pipe) is 2.2 mm and very superior results such as the parallelism within about ±2 degrees (FWHM value of 2 degrees or less) of the exit light can be produced. An aspect ratio (D/T) in this case is D/T=0.25/2.2=1/8.8. In fact, in view of balancing the light transmission rate and the parallelism, the aspect ratio (D/T) is desired to be determined in the range of $1/8 \leq D/T \leq 1/10$. Meanwhile, when the diameter D of the air pie is D=0.25 mm, it is optimum that the thickness T of the air-pipe element falls within the range of 2 mm or more and 2.5 mm or less.

Figure 7:
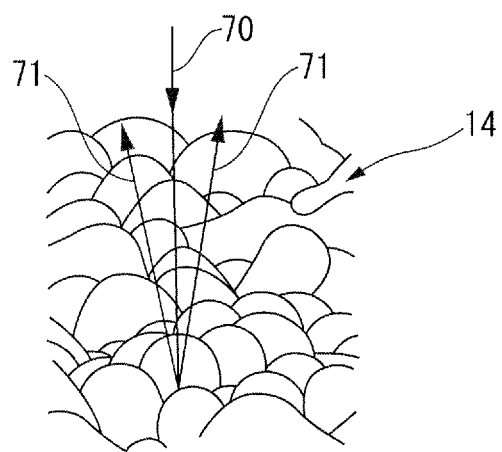
FIG. 7 is a diagram illustrating a surface of the low-angle light-diffusion element of the solar simulator in the first embodiment.

The low-angle light-diffusion element 14 of this embodiment is configured to have a surface structure formed in a three-dimensional random shape on a base made of such as polycarbonate, polyester or quartz, as shown in FIG. 7. Due to this surface structure, the light transmission rate of 90% or more can be obtained throughout an effective test wavelength range from an ultraviolet region to a near-infrared region, which are required for measurement of the solar panel. Furthermore, the low-angle light-diffusion element 14 is configured to provide a first function of deflecting by this surface structure pseudo parallel light applied from the reflector 12 to diffusely transmit, and a second function of diffusely reflecting by the surface structure the light that is specularly-reflected by the solar panel, passed through the air-pipe element 15 and reentered near perpendicularly thereto. In addition, by forming the low-angle light-diffusion element 14 in a film, it is possible to cover a large area.

Thanks for the first function, the real images of the xenon flash lamp 10 serving as a primary light source and the reflector 12 can be prevented from focusing on the surface of the solar panel, and the low-angle light-diffusion element 14 operates as a secondary light source. Also, thanks for the second function, the return light specularly-reflected by the surface of the solar panel turns into light 71 diffusely reflected by the surface of the low-angle light-diffusion element 14 when reentering the low-angle light-diffusion element 14 through inside the air pipes 15a of the air-pipe element 15 in the form of light substantially perpendicular to the low-angle light-diffusion element 14. Thus, all the light is never specularly-reflected by the surface of the low-angle light-diffusion element 14 to again return into the air-pipe element 15. In other words, a nonreflecting structure can be formed with the combination of the air-pipe element 15 and the low-angle light-diffusion element 14.

By adjusting diffusion angle and Haze factor, the light transmission and reflection diffusing characteristics of the low-angle light-diffusion element 14 is controlled so that the exit light or reflected light has a low diffusion angle such as FWHM value from 0.5 to 5 degreesc. As a result, more parallel light component can enter into the air-pipe element 15 from the low-angle light-diffusion element 14 by transmission or reflection.

As described above, experiments were conducted using a low-angle light-diffusion element with FWHM value of 0.5 degrees and a low-angle light-diffusion element with FWHM value of 1 degree. These experiments were performed by arranging the low-angle light-diffusion element at the light source side of the air-pipe element, and the parallelism of the light emitted from the air-pipe element was measured when pseudo parallel light is applied into the low-angle light-diffusion element. To be more specific, the parallelism was analyzed as follows. A film containing a yellow fluorescent substance in a surface parallel to the axis of the air-pipe element is fixed to a stable supporting member, and the state of propagation of light emitted from the air-pipe element and propagated along the film was taken with a camera from the axis perpendicular to the air-pipe element. The experimental results thus taken was analyzed. Each air pipe of the air-pipe element used has a diameter D of D=0.25 mm and an opening ratio of 84%. Based on the analyzed results, it is revealed that excellently proper parallel light can be obtained in the region from an upper surface (0 mm) to 30 mm above the upper surface of the air-pipe element when using a low-angle light-diffusion element that emits light having FWHM value of 0.5 degrees. The excellently proper parallel light can be also obtained in the region from the upper surface (0 mm) to 20 mm above the upper surface of the air-pipe element even when using a low-angle light-diffusion element that emits light having FWHM value of 1 degree. It should be noted that if using a low-angle light-diffusion element emitting exit light having FWHM value of exceeding 5 degrees, the light entering the air-pipe element becomes diffused light with a large scattering angle, consequently to make it impossible to obtain light having sufficient intensity from the air-pipe element. Thus, it is desired that the low-angle light-diffusion element 14 has a low diffusion angle with FWHM value from 0.5 to 5 degrees.

As described above, according to this embodiment, it is possible to convert the light into light with a high degree of parallelism by means of the air-pipe element 15. Also, since the low-angle light-diffusion element 14 is in contact with a surface on the light source side of the air-pipe element 15 to diffuse the light at a low diffusion angle, any optical image of the light source is completely diffused to make an exit plane of the low-angle light-diffusion element 14 acting like a secondary light source for emitting light with uniform light intensity. The return light reflected by the solar panel is applied to the exit plane 15d of the air-pipe element 15. A part of the return light, which is applied to the light-absorbing glass material 15b in the exit plane 15d, is mostly absorbed. The remaining part of the return light, which is applied to the exit plane 15d, is entered into the air pipes 15a. The entered light other than specularly reflected light component is absorbed by the air pipes 15a. Since the specularly reflected return light component of the entered light is applied to the low-angle light-diffusion element 14 through the air pipes 15a and most of the applied specularly reflected return light component is diffusely reflected by the surface of the low-angle light-diffusion element 14, the light component can scarcely return again to the solar panel through the air pipes 15a. Therefore, even when the xenon flash lamp 10 capable of emitting flash pulse light having a suitable spectrum is used as a light source, the solar simulator according to this embodiment can be reduced in whole size and further requires no complicated optical system, consequently to reduce manufacturing cost.

Needless to add, the air-pipe element of this embodiment may be replaced with a honeycomb optical element in eighth to tenth embodiments described below. According to this structure, the cost of manufacturing the device can be reduced dramatically.

Figure 8:
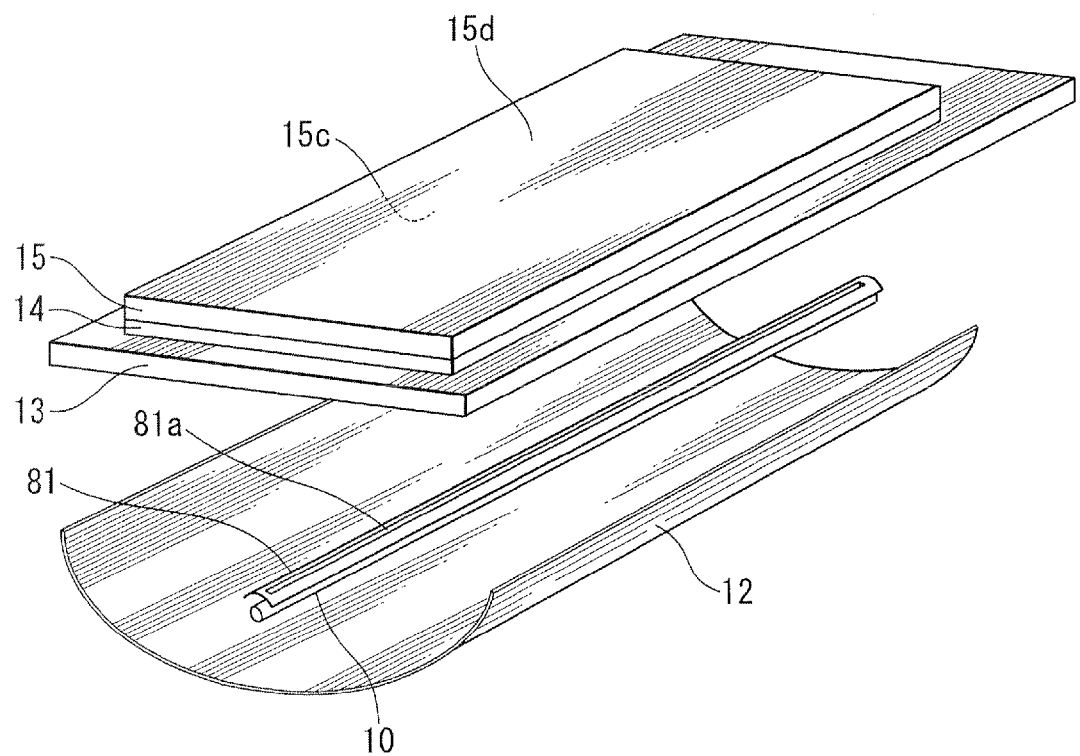
FIG. 8 is a perspective view schematically illustrating configuration of a solar simulator in a second embodiment according to the present invention.
Figure 9:
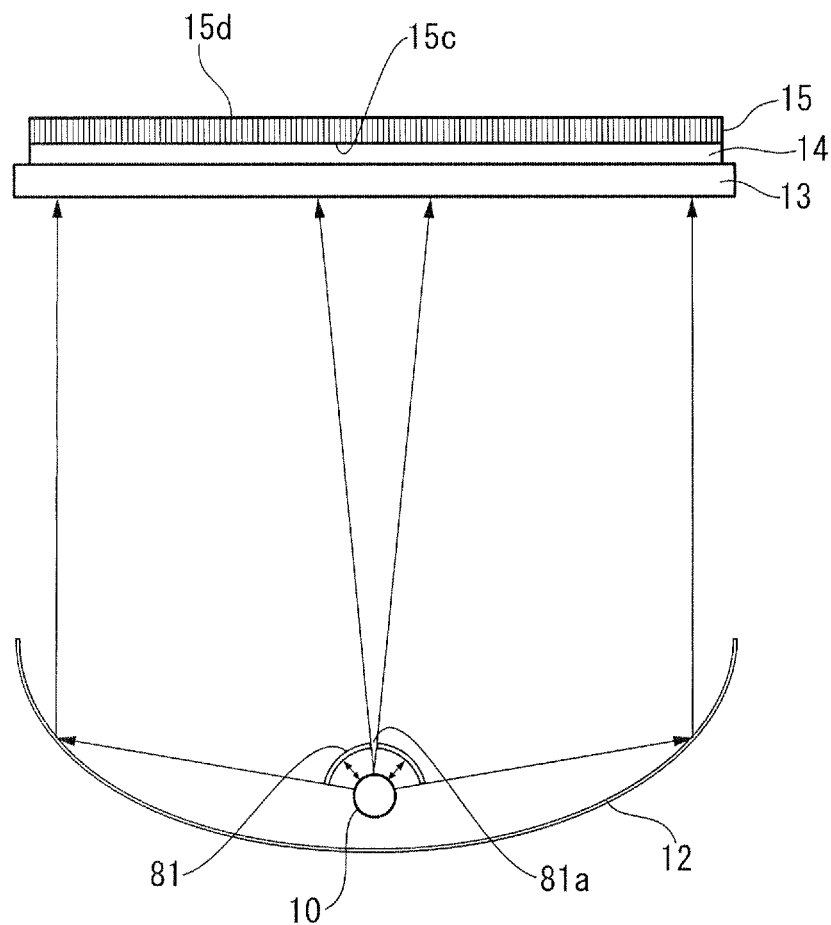
FIG. 9 is a sectional side view schematically illustrating configuration of the solar simulator in the second embodiment.

FIG. 8 and FIG. 9 schematically illustrate a solar simulator in a second embodiment according to the present invention. The solar simulator of this embodiment is almost the same as the solar simulator in the first embodiment except for an additional reflector used instead of the light-interception cover. Hence, the identical or similar components of this embodiment to those in the first embodiment are denoted by the same numerical symbols.

As illustrated in FIG. 8 and FIG. 9, the solar simulator of this embodiment incorporates the additional reflector 81. That is, the additional reflector 81 is used instead of the light-interception cover 11 in the first embodiment. This additional reflector 81 is formed in a semi-cylindrical shape having an axial section partially shaped in a round shape with a center of a circle placed at the optical axis of the xenon flash lamp 10, so that the light reflected upward (in the figure) from the xenon flash lamp 10 is specularly reflected to be effectively conducted to the reflector 12. Thus, the light which is blocked and scattered by the light-interception cover 11 thereby to be vanished as an optical loss in the first embodiment can be put to effective use. This additional reflector 81 is placed to face the reflector 12, wherein it is desirable that, as shown in FIG. 9, two lines connecting the both side edges of the additional reflector 81 with the optical axis of the xenon flash lamp 10 intersect in the reflective surface of the reflector 12 to make effective use of the light. Incidentally, a reflective plane capable of specular reflection (all-reflective surface) or a slightly diffusive plane may be used as a reflection surface of the additional reflector 81.

The additional reflector 81 of this embodiment has a slit-like aperture 81a elongating in the axial direction thereof. The slit-like aperture 81a is formed in the center part of the additional reflector 81 to directly conduct the light from the xenon flash lamp 10 vertically upward (in the figure), i.e. toward the low-angle light-diffusion element 14. This aperture 81a enables the light to be distributed vertically upward (in the figure), thereby to prevent inconvenience such as nonuniform distribution of light caused by casting a shadow of the additional reflector 81 upward (in the figure). The slit-like aperture 81a may be formed of one continuous opening or discontinuous openings. The light quantity passing through the aperture 81a is controlled by regulating the width of the aperture slit (circumferential length of the aperture 81a in this reflector 81) or attaching a light transmission control member such as a mesh for regulating the quantity of light transmitted there through.

Other configurations, functions and effects in this embodiment are identical with those in the first embodiment.

The air-pipe element of this embodiment may of course be replaced with a honeycomb optical element in eighth to tenth embodiments described below. According to this structure, the cost of manufacturing the device can be reduced dramatically.

Figure 10:
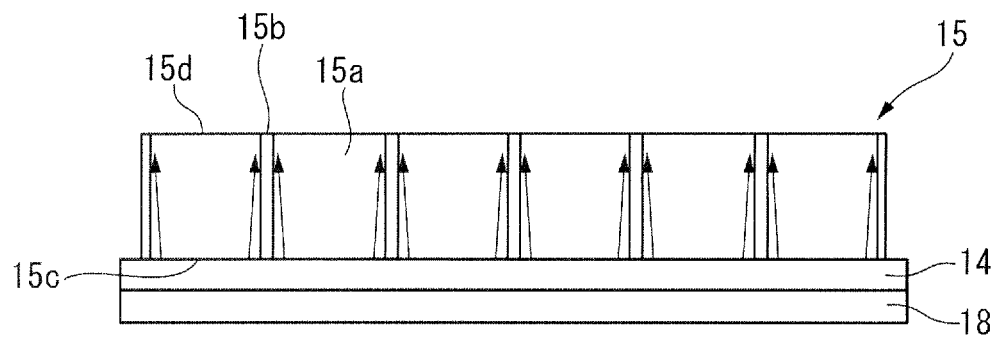
FIG. 10 is a sectional view schematically illustrating partial configurations of an air-mass filter, a low-angle light-diffusion element and an air-pipe element of a solar simulator in a third embodiment according to the present invention.

FIG. 10 schematically illustrates a partial configuration of an air-mass filter (corresponding to a property adjusting optical element in the present invention), a low-angle light-diffusion element and an air-pipe element of a solar simulator in a third embodiment according to the present invention. The solar simulator of this embodiment is almost the same as the solar simulator in the first and second embodiments except for the additionally mounted air-mass filter. Hence, the identical or similar components of this embodiment to those in the first and second embodiments are denoted by the same numerical symbols.

As illustrated in FIG. 10, the solar simulator of this embodiment has an air-mass filter 18 fixed onto a surface on the light source side of the low-angle light-diffusion element 14 with an optical adhesive. The air-mass filter 18 is used to adjust spectral distribution of light passing there through, so that the spectral distribution conforming to the international standard can easily be obtained. Specifically, in this embodiment, since the air-mass filter 18 is in contact with an incidence plane of the low-angle light-diffusion element 14, it is possible to prevent an optical loss (Fresnel loss) between the air-mass filter 18 and the low-angle light-diffusion element 14. The low-angle light-diffusion element 14 of this embodiment is desirably formed of an element capable of diffusing without color separation so as not to affect the spectral distribution regulated by the air-mass filter 18.

Other configurations, functions and effects in this embodiment are identical with those in the first and second embodiments.

The air-pipe element of this embodiment may of course be replaced with a honeycomb optical element in eighth to tenth embodiments described below. According to this structure, the cost of manufacturing the device can be reduced dramatically.

Figure 11:
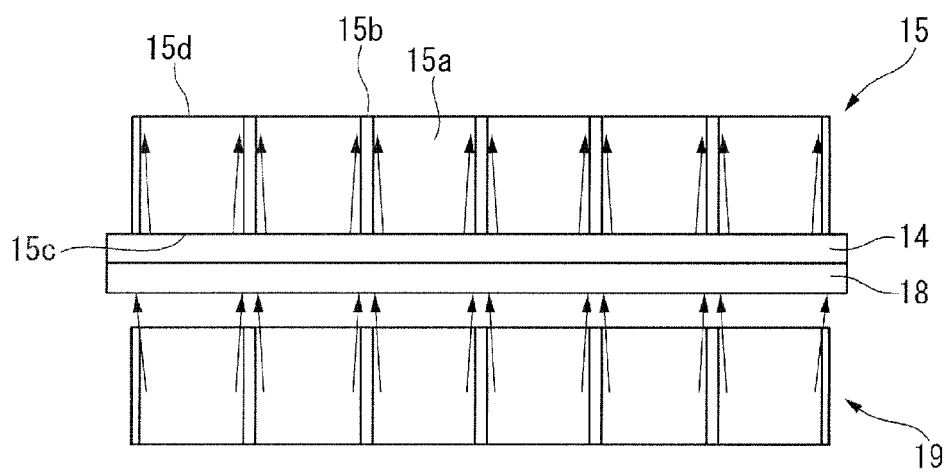
FIG. 11 is a sectional view schematically illustrating partial configurations of a first air-pipe element, an air-mass filter, a low-angle light-diffusion element and a second air-pipe element of a solar simulator in a fourth embodiment according to the present invention.

FIG. 11 schematically illustrates a partial configuration of a first air-pipe element, an air-mass filter, a low-angle light-diffusion element and a second air-pipe element of a solar simulator in a fourth embodiment according to the present invention. The solar simulator of this embodiment is almost the same as the solar simulator in the third embodiment except for having two air-pipe elements. Hence, the identical or similar components of this embodiment to those in the first, second and third embodiments are denoted by the same numerical symbols.

As illustrated in FIG. 11, the solar simulator of this embodiment has a first air-pipe element 19 on the light source side of the air-mass filter 18 independently of the second air-pipe element 15. The first air-pipe element 19 is exactly the same in structure as the second air-pipe element 15. Namely, the first air-pipe element 19 and the second air-pipe element 15 have the same aperture ratio to make their periodic functions equal, and center axes of the air pipes of the first air-pipe element 19 and center axes of the air pipes of the second air-pipe element 15 are coaxial, respectively.

The pseudo parallel light from the reflector 12 is increased in parallelism by means of the first air-pipe element 19 and then enters the air-mass filter 18. As is well known, the optical filter is so designed as to permit incidence of parallel light perpendicular to its incident plane, and also the air-mass filter 18 is so designed as to obtain optimal spectral distribution under the same condition. According to this embodiment, since the light entering the air-mass filter 18 is made parallel light having high parallelism by the first air-pipe element 19, good spectral distribution that conforms to the international standard can be easily obtained.

Other configurations, functions and effects in this embodiment are identical with those in the first, second and third embodiments.

The air-pipe element of this embodiment may of course be replaced with a honeycomb optical element in eighth to tenth embodiments described below. According to this structure, the cost of manufacturing the device can be reduced dramatically.

Figure 12:
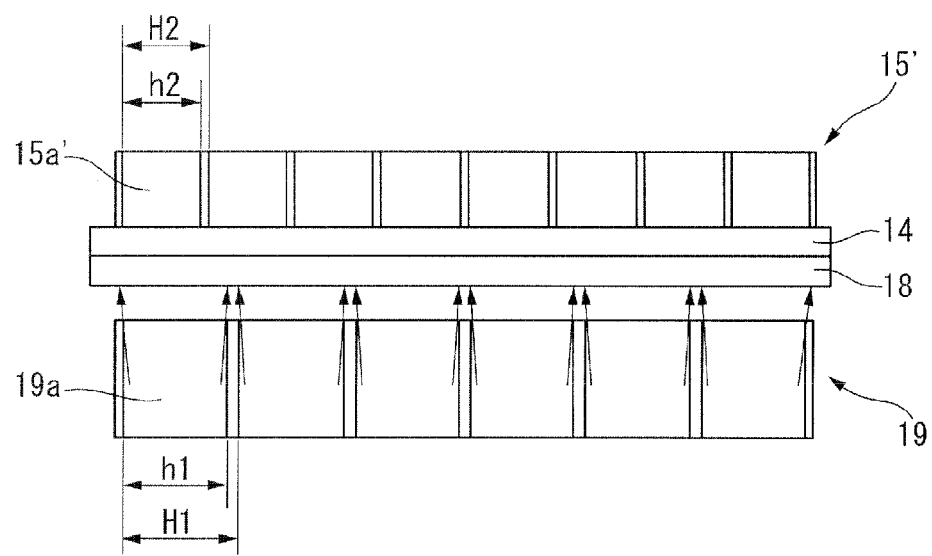
FIG. 12 is a sectional view schematically illustrating partial configurations of a first air-pipe element, an air-mass filter, a low-angle light-diffusion element and a second air-pipe element of a solar simulator in a fifth embodiment according to the present invention.

FIG. 12 schematically illustrates a partial configuration of a first air-pipe element, an air-mass filter, a low-angle light-diffusion element and a second air-pipe element of a solar simulator in a fifth embodiment according to the present invention. The solar simulator of this embodiment is almost the same as the solar simulator in the fourth embodiment except for difference in periodic function between the two air-pipe elements. Hence, the identical or similar components of this embodiment to those in the first, second, third and fourth embodiments are denoted by the same numerical symbols.

As illustrated in FIG. 12, in this embodiment, the periodic function $f(h1/H1)$ of the first air-pipe element 19 is different from the periodic function $f(h2/H2)$ of the second air-pipe element 15'. To be more specific, an inner diameter h1 and an outer diameter H1 of each of the air pipes 19a in the first air-pipe element 19 are respectively different from an inner diameter h2 and an outer diameter H2 of each of the air pipes 15a' in the second air-pipe element 15'. That is, both the opening ratios are different from each other. Hence, Moire fringes which cause non-uniform illumination can be prevented from emerging on the surface of the solar panel. However, it should ensure to prevent substantial decrease in light transmission rate due to superposition of the first air-pipe element 19 and the second air-pipe element 15' on each other.

Other configurations, functions and effects in this embodiment are identical with those in the first, second, third and fourth embodiments.

The air-pipe element of this embodiment may of course be replaced with a honeycomb optical element in eighth to tenth embodiments described below. According to this structure, the cost of manufacturing the device can be reduced dramatically.

Figure 13:
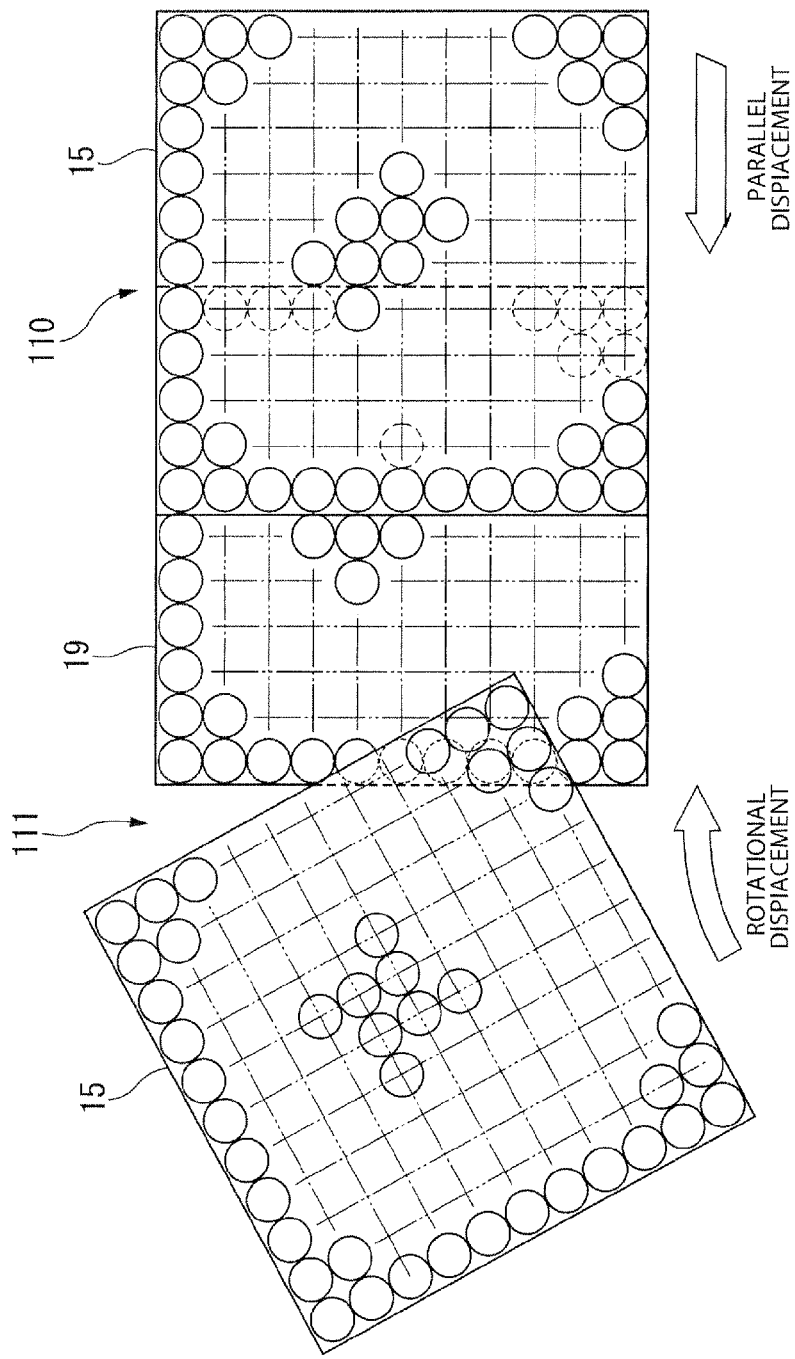
FIG. 13 is a diagram illustrating arrangement of an air-pipe element of a solar simulator in a sixth embodiment according to the present invention.

FIG. 13 is illustrative of an arrangement of an air-pipe element of a solar simulator in a sixth embodiment according to the present invention. The solar simulator of this embodiment is almost the same as the solar simulator in the fourth embodiment except for displacement of the center axes of the respective air pipes in the two air-pipe elements. Hence, the identical or similar components of this embodiment to those in the first, second, third and fourth embodiments are denoted by the same numerical symbols.

In this embodiment, the first air-pipe element 19 and second air-pipe element 15 superposed to each other have equal opening ratios as shown in FIG. 11, and therefore, are equal in periodic function. However, the center axes of the first air-pipe element 19 and the second air-pipe element 15 are displaced from each other. As illustrated in FIG. 13, displacement of the center axes may be fulfilled by either a parallel displacement manner 110 or a rotational displacement manner 111. According to this embodiment, faint Moire fringes are intentionally produced on the solar panel by superposing the air pipes having equal periodic functions to each other for controlling the intensity of the light incident on the solar panel. Namely, the light intensity is regulated with the amount of displacement of the center axes of the superposed air pipes. However, it should be noted that the emergence of too strong Moire fringes causes unevenness of lighting intensity.

Other configurations, functions and effects in this embodiment are identical with those in the first, second, third and fourth embodiments.

The air-pipe element of this embodiment may of course be replaced with a honeycomb optical element in eighth to tenth embodiments described below. According to this structure, the cost of manufacturing the device can be reduced dramatically.

Figure 14:
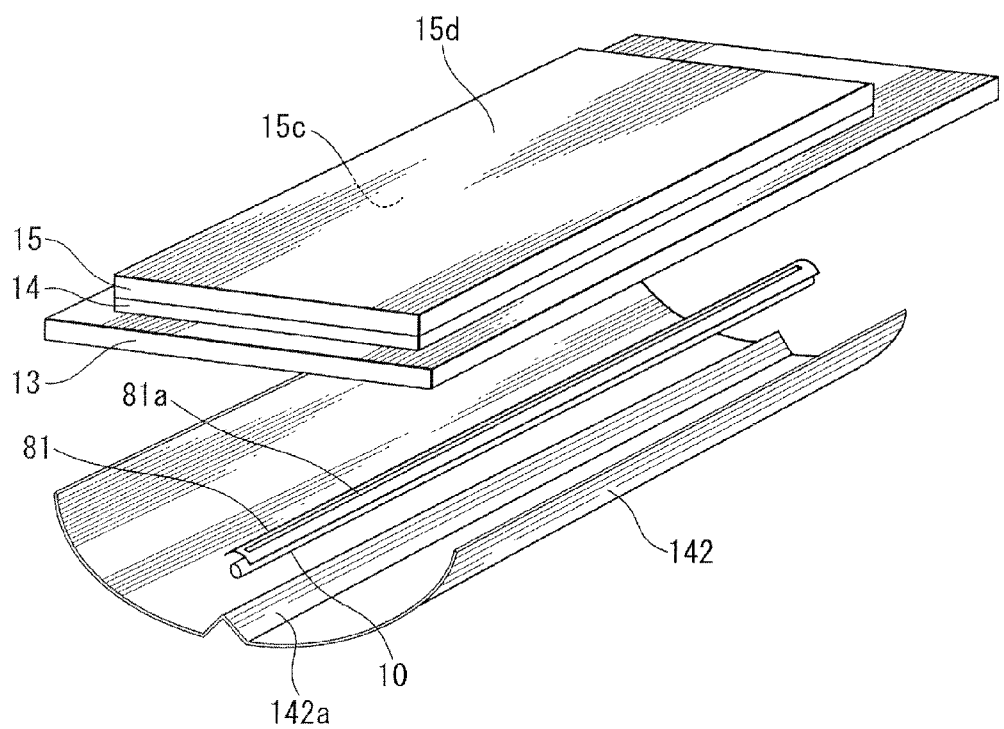
FIG. 14 is a perspective view schematically illustrating configuration of a solar simulator in a seventh embodiment according to the present invention.
Figure 15:
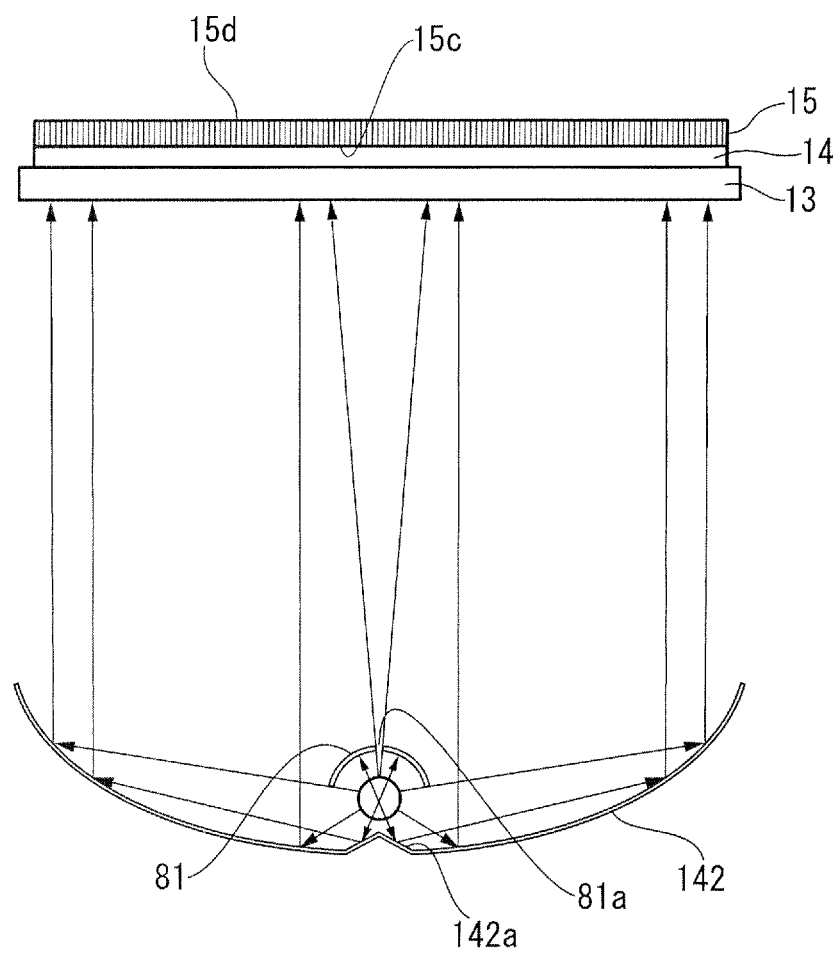
FIG. 15 is a sectional side view schematically illustrating configuration of the solar simulator in the seventh embodiment.

FIG. 14 and FIG. 15 schematically illustrate a configuration of a solar simulator in a seventh embodiment according to the present invention. The solar simulator of this embodiment is almost the same as the solar simulator in the second embodiment except for a partial configuration of the reflector. Hence, the identical or similar components of this embodiment to those in the second embodiment are denoted by the same numerical symbols.

As illustrated in FIG. 14 and FIG. 15, this embodiment has the additional reflector 81 as with the second embodiment. The additional reflector 81 is formed in a semi-cylindrical shape having an axial section partially shaped in a round shape with a center of a circle placed at the optical axis of the xenon flash lamp 10, so that the light reflected upward (in the figure) from the xenon flash lamp 10 is specularly reflected to be effectively conducted to a reflector 142. Therefore, the light which is blocked and scattered by the light-interception cover 11 thereby to be vanished as an optical loss in the first embodiment can be effectively used similarly to the second embodiment. The reflector 142 of this embodiment has a reflective surface 142a with an axial section formed in a shape of two sides of a triangle projecting toward the xenon flash lamp 10 and is disposed right below (in the figure) the xenon flash lamp 10. The purposefully projected formation of the reflective surface 142a serves to reflect the light emitted from the xenon flash lamp 10 to near-field regions of the side edges of the reflector 142, consequently to improve a problem of reduction of light quantity caused by non-arrival of the light to these near-field regions of the side edges. Meanwhile, the additional reflector 81 is placed to face the reflector 142, whereas it is desirable that, as shown in FIG. 15, two lines connecting the both side edges of the additional reflector 81 with the optical axis of the xenon flash lamp 10 intersect in the reflective surface of the reflector 142 to make effective use of the light.

The additional reflector 81 of this embodiment has a slit-like aperture 81a elongating in the axial direction thereof. The slit-like aperture 81a is formed in the center part of the additional reflector 81 to directly conduct the light from the xenon flash lamp 10 vertically upward (in the figure), i.e. toward the low-angle light-diffusion element 14. This aperture 81a enables the light to be distributed vertically upward (in the figure), thereby to prevent inconvenience such as non-uniform distribution of light caused by casting a shadow of the additional reflector 81 upward (in the figure). The slit-like aperture 81a may be formed of one continuous opening or discontinuous openings. The light quantity passing through the aperture 81a is controlled by regulating the width of the aperture slit (circumferential length of the aperture 81a in this reflector 81) or attaching a light transmission control member such as a mesh for regulating the quantity of light transmitted there through.

Other configurations, functions and effects in this embodiment are identical with those in the first, second, third and fourth embodiments.

The air-pipe element of this embodiment may of course be replaced with a honeycomb optical element in eighth to tenth embodiments described below. According to this structure, the cost of manufacturing the device can be reduced dramatically.

The opening ratio of the air-pipe element (ratio of the total opening area of the air pipes to the total area of the incidence plane or exit plane) with respect to the entire surface is specified as an invariable in the first to seventh embodiments described above, whereas the opening ratio may be made different in part of the surface. As for one example, it is possible to equalize the intensity of the light irradiate onto the whole surface of the solar panel by reducing the opening ratio to have a small light transmission rate at the center part near the xenon flash lamp 10, at which the light intensity is high, and conversely, by increasing the opening ratio to obtain a large light transmission rate at the both end parts far from the xenon flash lamp 10. Instead of partially varying the opening ratio of the air-pipe element, the diffusion angle of the low-angle light-diffusion element may partially vary to give variety to the incident angle onto the air-pipe element. For instance, since the light intensity is large at the center part near the xenon flash lamp 10, a low-angle light-diffusion element having a relatively large diffusion angle is employed there to permit incidence on the inner walls of the air pipes at a large angle, thereby to promote absorption and decrease the quantity of light through the air pipes. Whereas a low-angle light-diffusion element having a relatively small diffusion angle is employed at the both side end parts far from the xenon flash lamp 10 to permit incidence on the inner walls of the air pipes at a small angle, thereby to promote light transmission and increase the quantity of light through the air pipes. In this way, the intensity of the light impinging on the whole surface of the solar panel can be equalized. As the low-angle light-diffusion element 14, it is desired to use a low-angle light-diffusion element having no influence on spectral distribution even when varying the diffusion angle.

Figure 16:
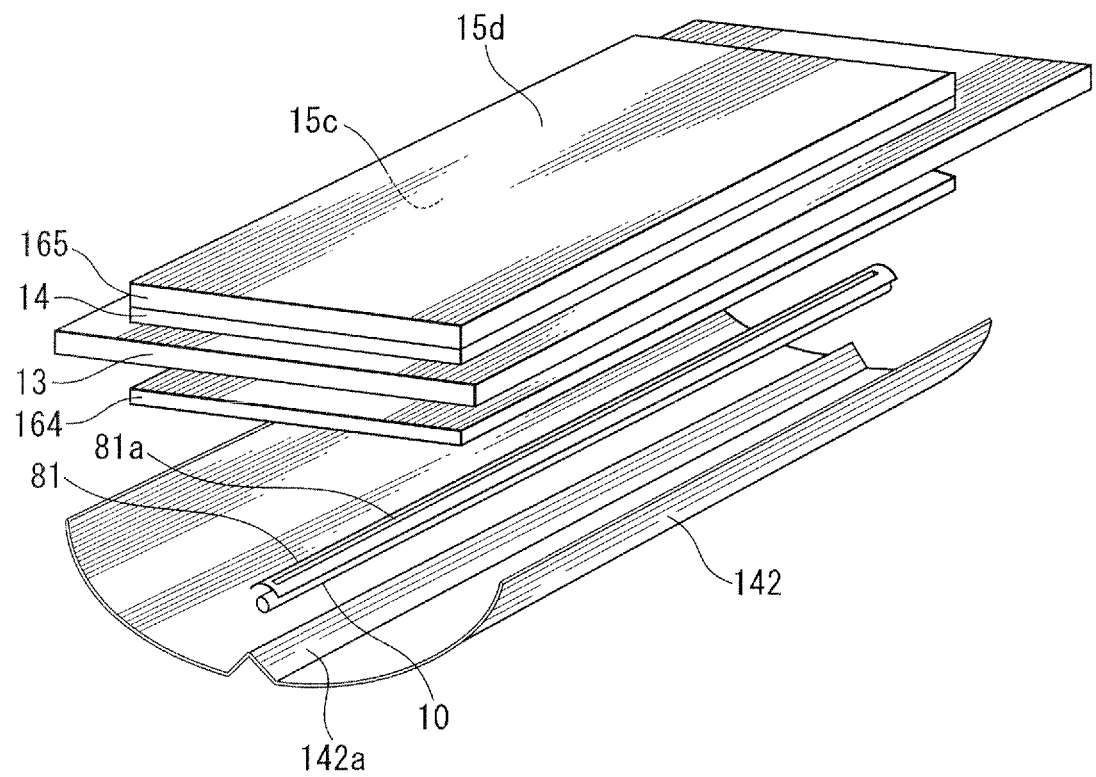
FIG. 16 is a perspective view schematically illustrating configuration of a solar simulator in an eighth embodiment according to the present invention.
Figure 17:
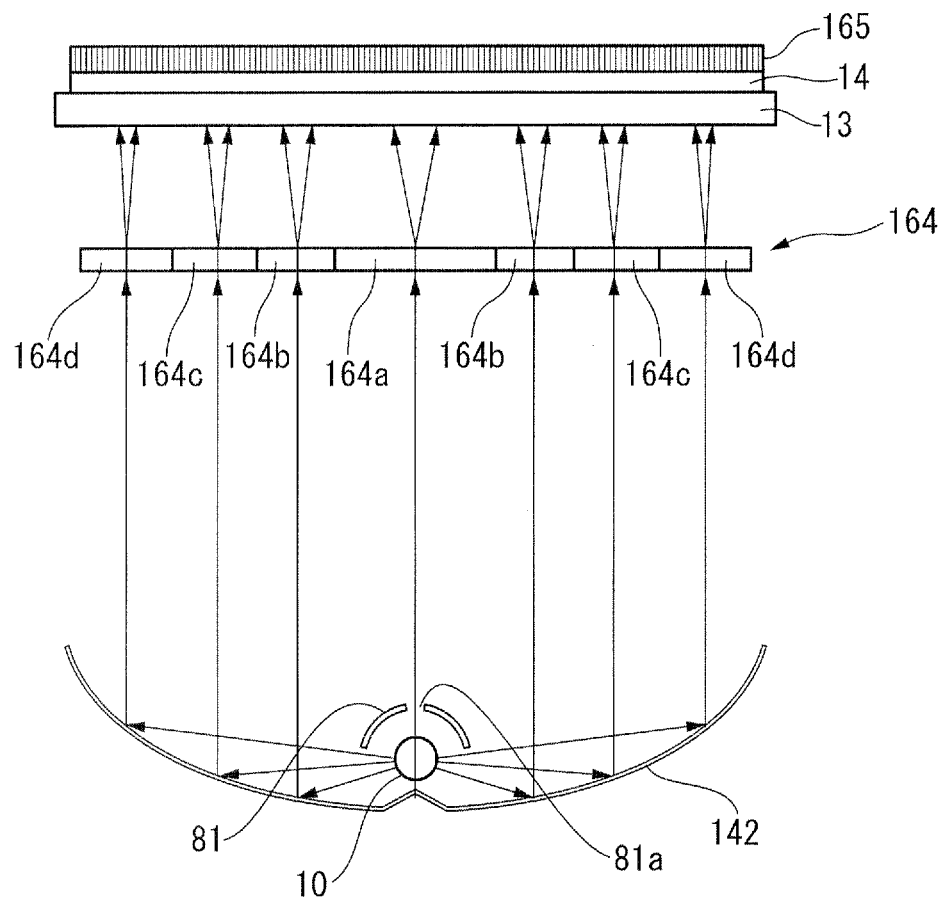
FIG. 17 is a sectional side view schematically illustrating the solar simulator in the eighth embodiment.
Figure 18:
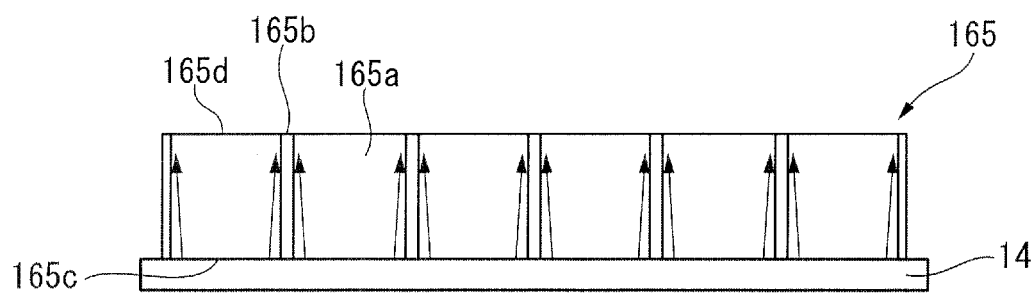
FIG. 18 is a sectional view schematically illustrating partial configurations of a light-diffusion optical element and a honeycomb optical element of the solar simulator in the eighth embodiment.

FIG. 16 and FIG. 17 schematically illustrate a configuration of a solar simulator in an eighth embodiment according to the present invention. FIG. 18 schematically illustrates a partial configuration of a low-angle light-diffusion element and a honeycomb optical element of the solar simulator. The solar simulator of this embodiment has almost the same configurations as that of the solar simulator in the seventh embodiment except that this simulator has a light diffusing element for adjusting light intensity distribution and that the honeycomb optical element is used in place of the air-pipe element. Hence, the identical or similar components of this embodiment to those in the seventh embodiment are denoted by the same numerical symbols.

As illustrated in FIG. 16 and FIG. 17, in this embodiment, the light diffusing element 164 for adjusting light intensity distribution is arranged between the reflector 142 with the additional reflector 81 and the low-angle light-diffusion element 14 with the support substrate 13. This light diffusing element 164 serves to make the peak intensity distribution of the light directly transmitted from the xenon flash lamp 10 through the slit-like aperture 81a or reflected by the reflector 142 and then applied to the low-angle light-diffusion element 14, as even as possible. The light from the xenon flash lamp 10 and the reflector 142 has the highest light intensity at its center and becomes weaker as coming closer to the peripheral portion of the reflector 142. Thus, as for the light diffusing element 164, a diffusing element having a large diffusion angle at its center and a smaller diffusion angle at its periphery is used, so that the peak intensity of the light entering the low-angle light-diffusion element 14 can be equalized. Besides, since the adjustment is carried out with difference in diffusion angle but not in light transmission rate of the low-angle light-diffusion element, no absorption of the light occurs and therefore no reduction of the light energy occurs in the aggregate.

As a concrete example of the light diffusing element 164 for adjusting light intensity distribution, used is a diffusing element having a diffusion angle of 20 degrees in the first area 164a at its center portion, a diffusion angle of 10 degrees in the second area 164b on the outside thereof, a diffusion angle of 5 degrees in the third area 164c on the outside thereof, and a diffusion angle of 1 degree in the fourth area 164d on the outside thereof, as shown in FIG. 17. The light transmission rate of every areas of the diffusing element is 96%. Such light diffusing element 164 can be formed by cutting diffusing films with different diffusion angles into appropriate widths and attaching these cut diffusing films onto a supporting glass plate using an optical adhesive film. In this concrete example, the light diffusing element is divided into four areas different in diffusion angle, but it may be divided into any plural number of areas other than four. As for the light diffusing element 164, a single film with a diffusion angle continuously changed can be used. However, since an actual optical system requires delicate adjustment in accordance with the accuracy of the reflective surfaces of the reflector 142 and the additional reflector 81 and with the shape of the xenon flash lamp 10, it is desirable to adjust the width of the respective areas by cutting the diffusing films with different diffusion angles into appropriate widths to equalize the light intensity energy. Using of such light diffusing element 164 for adjusting light intensity distribution will result a light non-uniformity of the finally produced exit light within ±3%.

Figure 19:
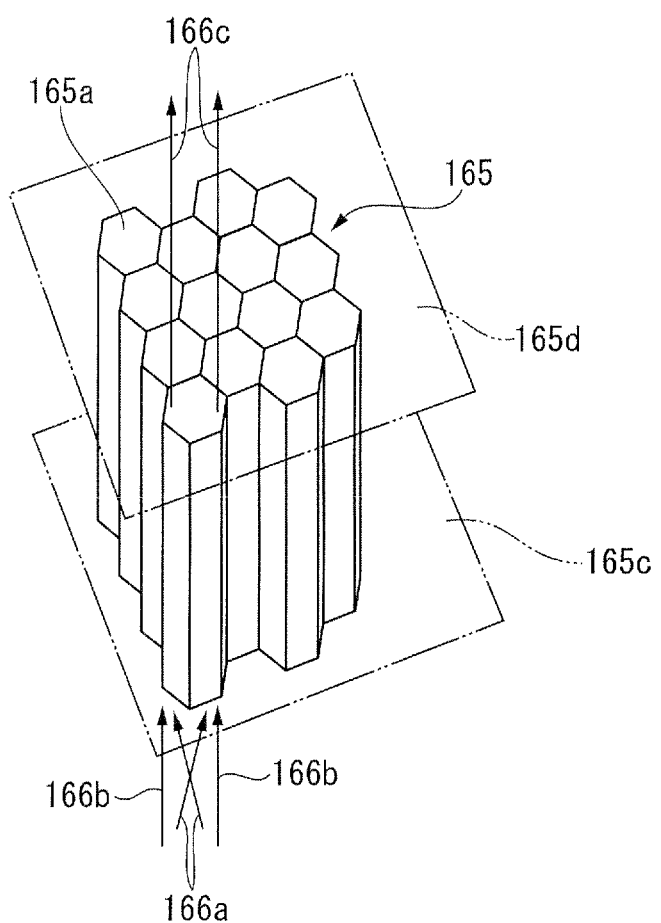
FIG. 19 is a perspective view schematically illustrating the honeycomb optical element of the solar simulator in the eighth embodiment.

As shown in FIG. 16, FIG. 17 and FIG. 18, the solar simulator of this embodiment has a honeycomb optical element 165 made of aluminum, which is formed of a number of honeycomb-shaped air holes arranged parallel to one another and arranged proximately on the low-angle light-diffusion element 14. The honeycomb optical element 165 is formed by arraying the honeycomb-shaped air holes in parallel to the thickness direction thereof and has characteristics of allowing incident light parallel to the axes of the air holes to pass therethrough and allowing nonparallel incident light to reflect diffusely so as to be attenuated. That is, as shown in FIG. 18 and FIG. 19, the honeycomb optical element 165 includes a lot of the honeycomb-shaped straight air holes 165a each having a regular hexagonal section and filled with air, which are straight in the axial direction and arranged parallel to one another. The diameter of each honeycomb-shaped air hole 165a (distance between the opposite sides of the regular hexagon) is about 1 mm in this embodiment, but it is determined according to required parallelism of the exit light, and the length of the honeycomb-shaped air hole 165a (thickness of the honeycomb optical element 165) is ten times the diameter. The thickness of the wall 165b between the adjacent honeycomb-shaped air holes 165a is about 50 μm.

Since the honeycomb-shaped air hole 165a has a mirrored inner wall surface, the incident light obliquely entering from the incidence plane on the light source side of the honeycomb optical element 165 is randomly reflected by the inner wall surface of the honeycomb-shaped air hole 165a to be attenuated, thereby to reduce the light intensity of the light exiting from the exit plane 165d on the opposite side of the light source, that is, not to emit, from the exit plane side 165d, the light having not less than a prospective angle determined depending on a value "length/diameter" of the honeycomb-shaped air hole 165a. Meanwhile, the incident light 166b entering substantially parallel to the axis of the hole from the incident plane 165c exits in the form of the light with a high degree of parallelism out of the exit plane 165d. The light exiting from the exit plane 165d is irradiated on the solar panel in the form of light with high parallelism of about ±2 degrees. When the return light specularly reflected by the surface of the solar panel enters the exit plane 165d, the light is diffusely reflected or absorbed by making the surface rough or by blacking the surface with black anodized treatment or the like, so that the return light (stray light) can be attenuated even when impinging on that surface. Hence, when the return light in the form of diffused light or parallel light enters reversely onto the exit plane 165d, it is somewhat reduced in light intensity to prevent extensive reflection, specifically specular reflection. Consequently, measurement error caused by the return light can be prevented significantly.

As described above, according to this embodiment, it is possible to convert the light into light with a high degree of parallelism by means of the honeycomb optical element 165. Also, since the low-angle light-diffusion element 14 is in contact with a surface on the light source side of the honeycomb optical element 165 to diffuse the light at a low diffusion angle, any optical image of the light source is completely diffused to make an exit plane of the low-angle light-diffusion element 14 acting like a secondary light source for emitting light with uniform light intensity. The return light reflected by the solar panel is applied to the exit plane 165d of the honeycomb-shaped air holes 165a. A component of the return light, which is applied to the honeycomb-shaped air holes 165a other than specularly reflected light component is reflected diffusely by the honeycomb-shaped air holes 165a to be reduced. Since the specularly reflected return light component of the entered light is applied to the low-angle light-diffusion element 14 through the honeycomb-shaped air holes 165a and most of the applied specularly reflected return light component is diffusely reflected by the surface of the low-angle light-diffusion element 14, the light component can scarcely return again to the solar panel through the honeycomb-shaped air holes 165a. Therefore, even when the xenon flash lamp 10 capable of emitting flash pulse light having a suitable spectrum is used as a light source, the solar simulator according to this embodiment can be reduced in whole size and further requires no complicated optical system, consequently to reduce manufacturing cost. Besides, the large-size honeycomb-shaped air holes 165a are available at low cost, thereby to dramatically reduce the cost of manufacturing the device. Moreover, it advantageously excels in durability and can easily be manufactured. Other configurations, functions and effects in this embodiment are identical with those in the seventh embodiment.

If the whole including the honeycomb-shaped air holes 165a in the honeycomb optical element 165 of this embodiment is black anodized or the like, there can be obtained faculties for allowing incident light parallel to the axis of the honeycomb-shaped air holes 165a to be transmitted there through and nonparallel incident light to be absorbed, thereby to enable emission the light with higher parallelism.

The air-pipe element used in the first to seventh embodiments may of course be used in place of the honeycomb optical element of this embodiment. According to this structure, the light with a much higher degree of parallelism can be produced.

Figure 20:
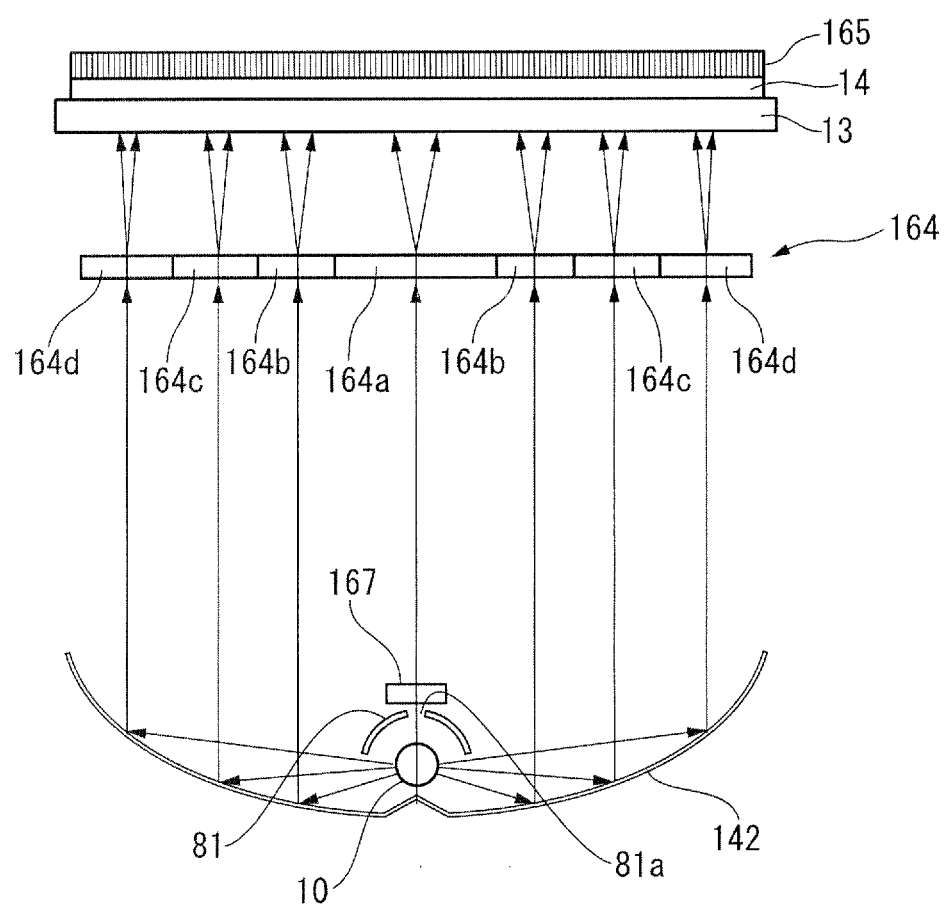
FIG. 20 is a sectional side view schematically illustrating a solar simulator in a ninth embodiment according to the present invention.

FIG. 20 schematically illustrates a solar simulator in a ninth embodiment according to the present invention. The solar simulator of this embodiment is almost the same as the solar simulator in the eighth embodiment except for an additional light diffusing optical element for adjusting light intensity arranged between the slit-like aperture of the additional reflector and the light diffusing optical element for adjusting light intensity. Hence, the identical or similar components of this embodiment to those in the eighth embodiment are denoted by the same numerical symbols.

As shown in FIG. 20, this embodiment has an additional light diffusing optical element 167 for adjusting light intensity, arranged between the slit-like aperture 81a of the additional reflector 81 and the light diffusing optical element 164 for adjusting light intensity. This additional light diffusing optical element 167 for adjusting light intensity serves to reduce the peak intensity of light emitted directly from the xenon flash lamp 10 through the slit-like aperture 81a and further equalize the peak intensity distribution of the light finally impinging on the low-angle light-diffusion element 14. In this embodiment, a plurality of light diffusing optical elements for adjusting light intensity are overlapped to adjust not only light diffusivity but also non-uniformity in light intensity. That is, in this embodiment, no-uniformity in light intensity, which is impossible to be adjusted by a single light diffusing optical element for adjusting light intensity is adjusted by duplicating light diffusing elements having similar diffusion angles or different diffusion angles (provided that the light diffusing elements are set interspatially). The additional light diffusing optical element 167 for adjusting light intensity in this embodiment is formed by adhering a diffusing film of about 40 degrees in diffusion angle and 96% in light transmission rate to a support glass plate by means of an optical adhesive film.

Other configurations, functions and effects in this embodiment are identical with those in the eighth embodiment.

The air-pipe element used in the first to seventh embodiments may of course be used in place of the honeycomb optical element of this embodiment. According to this structure, the light with a much higher degree of parallelism can be produced.

Figure 21:
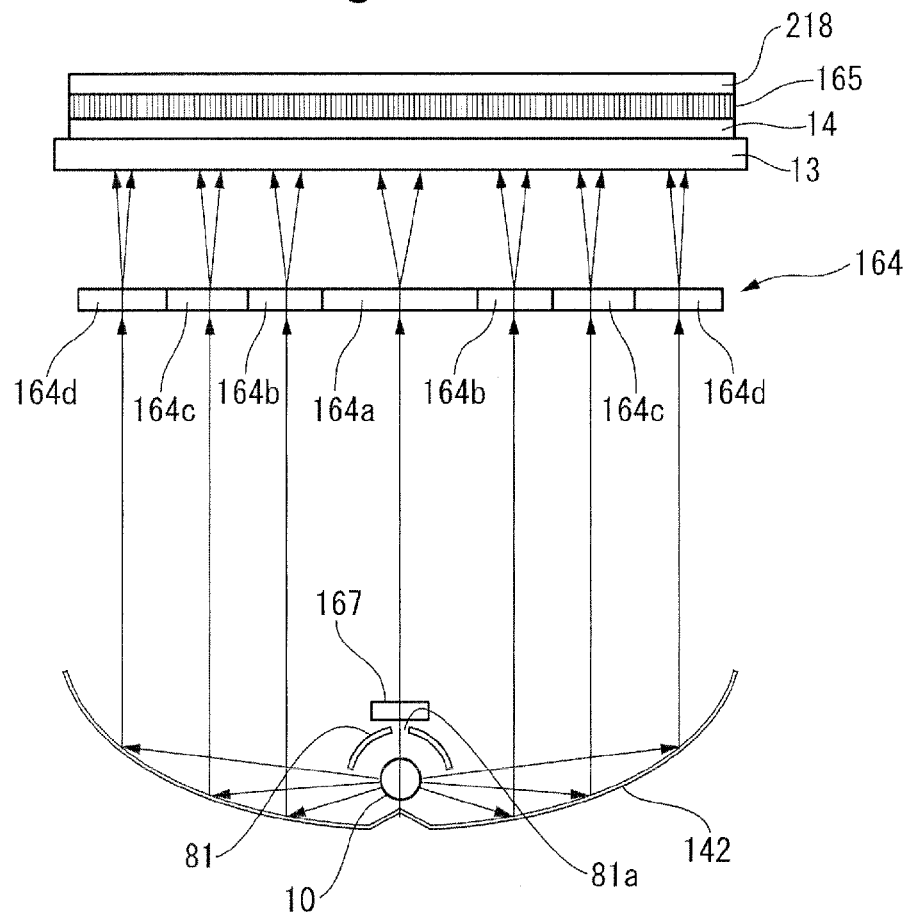
FIG. 21 is a sectional side view schematically illustrating a solar simulator in a tenth embodiment according to the present invention.
Figure 22:
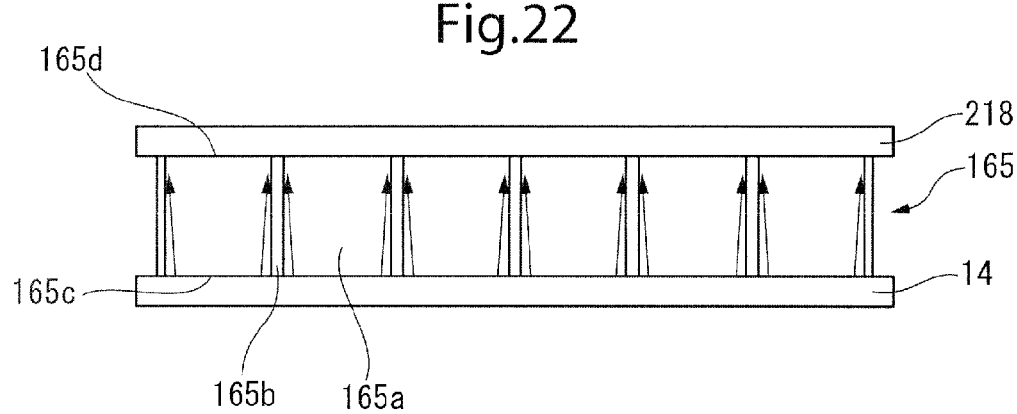
FIG. 22 is a sectional view schematically illustrating partial configurations of a light-diffusion optical element, a honeycomb optical element and an air-mass filter of the solar simulator in the tenth embodiment.

FIG. 21 schematically illustrates a solar simulator in a tenth embodiment according to the present invention, and FIG. 22 schematically illustrates a partial configuration of a light diffusing element, a honeycomb optical element and an air-mass filter of the solar simulator of this embodiment. The solar simulator of this embodiment is almost the same as the solar simulator in the ninth embodiment except for the air-mass filter used additionally (corresponding to the property adjusting optical element in the present invention). Hence, the identical or similar components in this embodiment to those in the ninth embodiment are denoted by the same numerical symbols.

As shown in FIG. 21 and FIG. 22, this embodiment has an air-mass filter 218 fixed onto the exit plane 165d of the honeycomb optical element 165 by means of an optical adhesive. The air-mass filter 218 is to adjust the spectral distribution of the light passing there through, so that the spectral distribution conforming to the international standard can easily be obtained. Specifically, in this embodiment, since the air-mass filter 218 and the exit plane 165d of the honeycomb optical element 165 are in contact with each other, it is possible to prevent an optical loss (Fresnel loss) from being occurred between the exit plane 165d and the air-mass filter 218. Besides, since the air-mass filter 218 allows for entering of the exit light with a high degree of parallelism from the honeycomb optical element 165, it is possible to adjust spectral distribution with high accuracy (adjustment of Class AAA in spectral agreement against international standard).

Other configurations, functions and effects in this embodiment are identical with those in the ninth embodiment.

The air-pipe element used in the first to seventh embodiments may of course be used in place of the honeycomb optical element of this embodiment. According to this structure, the light with a much higher degree of parallelism can be produced.

Figure 23:
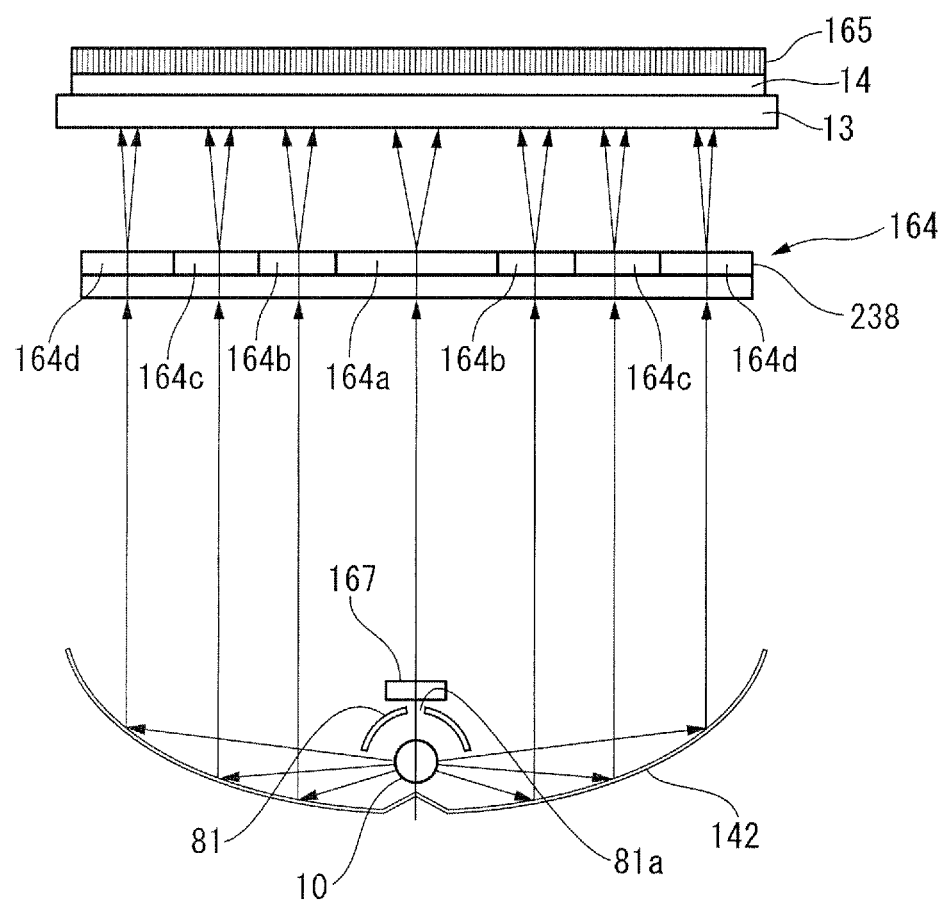
FIG. 23 is a sectional side view schematically illustrating the solar simulator in an eleventh embodiment according to the present invention.

FIG. 23 schematically illustrates a solar simulator in an eleventh embodiment according to the present invention. The solar simulator of this embodiment is almost the same as the solar simulator in the tenth embodiment except for mounting position of the air-mass filter (corresponding to the property adjusting optical element in the present invention). Hence, the identical or similar components of this embodiment to those in the tenth embodiment are denoted by the same numerical symbols.

As shown in FIG. 23, the solar simulator of this embodiment has an air-mass filter 238 fixed onto the surface on the light source side of the light diffusing element 164 for adjusting light intensity distribution by means of an optical adhesive. The air-mass filter 238 is to adjust the spectral distribution of the light passing there through, so that the spectral distribution conforming to the international standard can easily be obtained. Specifically, in this embodiment, since the air-mass filter 238 and the incidence plane of the light diffusing element 164 for adjusting light intensity distribution are in contact with each other, it is possible to prevent an optical loss (Fresnel loss) from being occurred between the incidence plane and the air-mass filter 238. Besides, the light diffusing element 164 for adjusting light intensity distribution of this embodiment is preferably formed of an element capable of diffusing without color separation so as not to affect the spectral distribution regulated by the air-mass filter 238.

Other configurations, functions and effects in this embodiment are identical with those in the tenth embodiment.

The air-pipe element used in the first to seventh embodiments may of course be used in place of the honeycomb optical element of this embodiment. According to this structure, the light with a much higher degree of parallelism can be produced.

Many widely different embodiments of the present invention may be constructed without departing from the spirit and scope of the present invention. It should be understood that the present invention is not limited to the specific embodiments described in the specification, except as defined in the appended claims.

INDUSTRIAL APPLICABILITY

The present invention is applicable to every field for necessitating pseudo solar light for measuring photoelectric transfer characteristics of a solar panel and performing deterioration characteristic test, and further useful for other, specifically technical fields demanding pseudo solar light having a high degree of parallelism and a spectral distribution close to that of natural sunlight.

| EXPLANATION OF REFERENCE NUMERALS | |
|---|---|
| 10 | Xenon Flash Lamp |
| 11 | Light-interception cover |
| 12, 142 | Reflector |
| 13 | Support substrate |
| 14 | Low-angle light-diffusion element |
| 15, 15', 19 | Air-pipe element |
| 15a, 15a', 19a, 61 | Air Pipe |
| 15b | Light-absorbing glass material |
| 15c, 165c | Incidence Plane |
| 15d, 165d | Exit Plane |
| 16a, 166a | Oblique Incident Light |
| 16b, 166b | Parallel Incident Light |
| 16c, 166c | Light with a high degree of parallelism |
| 17a | Return Light (Stray Light) |
| 17b | Reflected Light Of The Return Light |
| 18, 218, 238 | Air-mass filter |
| 60 | Black Glass Plate |
| 61a | Inner Wall Surface |
| 62 | Exit Light |
| 70 | Near-Vertical Light |
| 71 | Reflected Diffusion Light |
| 81 | Additional Reflector |
| 81a | Slit-like aperture |
| 142a | Reflective surface |
| 164 | Light diffusing element for adjusting light intensity distribution |
| 164a, 164b, 164c, 164d | Region |
| 165 | Honeycomb optical element |
| 165a | Honeycomb air hole |
| 165b | Wall |
| 167 | Additional light diffusing element for adjusting light intensity distribution |

The invention claimed is:

1. A solar simulator comprising:
a light source;
an optical reflection element positioned behind said light source to reflect light emitted from said light source in a form of pseudo parallel light;
a low-angle light-diffusion optical element for diffusing the reflected light from said optical reflection element at a low diffusion angle; and
a parallel light conversion optical element including a number of air holes arranged in parallel rows and provided with faculties for transmitting incident light parallel to the axis of said air holes to absorb or attenuate nonparallel incident light, said parallel light conversion optical element converting the incident light from said low-angle light-diffusion optical element to parallel light and emitting the converted parallel light,
said parallel light conversion optical element comprising an air-pipe optical element including a number of air pipes arranged in parallel rows and provided with faculties for allowing incident light parallel to the axis of the air holes to be transmitted there through and nonparallel incident light to be absorbed,
an incident light from said low-angle light-diffusion optical element being converted to parallel light and the converted parallel light is emitted,
a surface on a light exit side of said air-pipe element being configured by a light-absorbing rough surface.

2. The solar simulator as claimed in claim 1, wherein an exit plane of said low-angle light-diffusion optical element is in contact with an incidence plane of said parallel light conversion optical element, and wherein said low-angle light-diffusion optical element is adapted to diffusely reflect an incidence light from said parallel light conversion optical element at its surface.

3. The solar simulator as claimed in claim 1, wherein the low diffusion angle of said low-angle light-diffusion optical element corresponds to FWHM value from 0.5 to 5 degrees.

4. The solar simulator as claimed in claim 1, wherein a light-absorptive material is filled between adjacent air pipes of said air-pipe optical element.

5. The solar simulator as claimed in claim 1, wherein said parallel light conversion optical element comprises a honeycomb optical element including a number of honeycomb air holes arranged in parallel rows and provided with faculties for transmitting incident light parallel to an axis of the air holes to attenuate nonparallel incident light, and wherein an incident light from said low-angle light-diffusion optical element is converted to parallel light and the converted parallel light is emitted.

6. The solar simulator as claimed in claim 1, wherein said solar simulator further comprises a property adjusting optical element arranged in contact with a surface on a light source side of said low-angle light-diffusion optical element to adjust spectral distribution property of the light from said light source and said optical reflection element.

7. The solar simulator as claimed in claim 1, wherein said solar simulator further comprises a property adjusting optical element arranged in contact with a surface opposite to a surface of a light source side of said parallel light conversion optical element to adjust spectral distribution property of the light from said light source and said optical reflection element.

8. The solar simulator as claimed in claim 1, wherein said solar simulator further comprises a light diffusing optical element for adjusting light intensity distribution, arranged between said optical reflection element and said low-angle light-diffusion optical element to adjust the light intensity distribution of the reflected light applied from said optical reflection element to said low-angle light-diffusion optical element.

9. The solar simulator as claimed in claim 1, wherein said optical reflection element comprises a reflector having an axial section shaped in a parabola or an approximate parabola, and wherein said light source is positioned at a focal point of the axial section of said reflector.

10. The solar simulator as claimed in claim 9, wherein said solar simulator further comprises an additional reflector arranged on a side of said low-angle light-diffusion optical element of said light source to reflect an incident light from said light source toward said optical reflection element, said additional reflector having an axial section shaped in a partially round shape, and wherein said light source is positioned at a focal point of the axial section of said additional reflector.

11. The solar simulator as claimed in claim 10, wherein a slit is formed in a part on a side of said low-angle light-diffusion optical element of said additional reflector.

12. The solar simulator as claimed in claim 9, wherein said optical reflection element comprises a reflective surface near said light source, said reflective surface having an axial section formed in a shape of two sides of a triangle projecting toward said light source.

13. A solar simulator comprising:
a light source;
an optical reflection element positioned behind said light source to reflect light emitted from said light source in a form of pseudo parallel light;
a first parallel light conversion optical element including a number of air holes arranged in parallel rows and provided with faculties for transmitting incident light parallel to the axis of said air holes to absorb at least a part of nonparallel incident light, said first parallel light conversion optical element converting the incident light from said optical reflection element into parallel light;

a low-angle light-diffusion optical element for diffusing the light from said first parallel light conversion optical element at a low diffusion angle; and a second parallel light conversion optical element including a number of air holes arranged in parallel rows and provided with faculties for transmitting incident light parallel to the axis of said air holes to absorb or attenuate nonparallel incident light, said second parallel light conversion optical element converting the incident light from said low-angle light-diffusion optical element to parallel light and emitting the converted parallel light.

14. The solar simulator as claimed in claim 13, wherein an exit plane of said low-angle light-diffusion optical element is in contact with an incidence plane of said second parallel light conversion optical element, and wherein said low-angle light-diffusion optical element is adapted to diffusely reflect an incidence light from said second parallel light conversion optical element at its surface.

15. The solar simulator as claimed in claim 13, wherein the low diffusion angle of said low-angle light-diffusion optical element corresponds to FWHM value from 0.5 to 5 degrees.

16. The solar simulator as claimed in claim 13, wherein said first parallel light conversion optical element comprises a first air-pipe optical element including a number of air pipes arranged in parallel rows and provided with faculties for allowing incident light parallel to the axis of the air holes to be transmitted there through and nonparallel incident light to be absorbed, wherein an incident light from said optical reflection element is converted to parallel light and the converted parallel light is emitted, wherein said second parallel light conversion optical element comprises a second air-pipe optical element including a number of air pipes arranged in parallel rows and provided with faculties for allowing incident light parallel to the axis of the air holes to be transmitted there through and nonparallel incident light to be absorbed, wherein an incident light from said low-angle light-diffusion optical element is converted to parallel light and the converted parallel light is emitted.

17. The solar simulator as claimed in claim 16, wherein surfaces on light exit sides of said first and second air-pipe elements are configured by light-absorbing rough surfaces.

18. The solar simulator as claimed in claim 16, wherein a light-absorptive material is filled between the adjacent air pipes of each of said first and second air-pipe optical elements.

19. The solar simulator as claimed in claim 13, wherein said first parallel light conversion optical element comprises a honeycomb optical element including a number of honeycomb air holes arranged in parallel rows and provided with faculties for transmitting incident light parallel to the axis of the air holes to attenuate nonparallel incident light, wherein an incident light from said optical reflection element is converted to parallel light and the converted parallel light is emitted, wherein said second parallel light conversion optical element comprises a honeycomb optical element including a number of honeycomb air holes arranged in parallel rows and provided with faculties for transmitting incident light parallel to the axis of the air holes to attenuate the nonparallel incident light, and wherein an incident light from said low-angle light-diffusion optical element is converted to parallel light and the converted parallel light is emitted.

20. The solar simulator as claimed in claim 13, wherein said solar simulator further comprises a property adjusting optical element arranged in contact with a surface of said low-angle light-diffusion optical element, on a side of said first parallel light conversion optical element, to adjust spectral distribution property of the incident light from said first parallel light conversion optical element.

21. The solar simulator as claimed in claim 13, wherein said solar simulator further comprises a property adjusting optical element arranged in contact with a surface opposite to a surface of said light source side of said second parallel light conversion optical element to adjust spectral distribution property of the light from said light source and said optical reflection element.

22. The solar simulator as claimed in claim 13, wherein the first and second parallel light conversion optical elements have periodic functions different from each other.

23. The solar simulator as claimed in claim 13, wherein said first and second parallel light conversion optical elements have equal periodic functions, and wherein the center axis of the air holes in said first parallel light conversion optical element is displaced from the center axis of the air holes in said second parallel light conversion optical element to control a quantity of light incident on an irradiation object.

24. The solar simulator as claimed in claim 13, wherein said solar simulator further comprises a light diffusing optical element for adjusting light intensity distribution, arranged between said optical reflection element and said low-angle light-diffusion optical element to adjust the light intensity distribution of the reflected light applied from said optical reflection element to said low-angle light-diffusion optical element.

25. The solar simulator as claimed in claim 13, wherein said optical reflection element comprises a reflector having an axial section shaped in a parabola or an approximate parabola, and wherein said light source is positioned at a focal point of the axial section of said reflector.

26. The solar simulator as claimed in claim 25, wherein said solar simulator further comprises an additional reflector arranged on a side of said low-angle light-diffusion optical element of said light source to reflect an incident light from said light source toward said optical reflection element, said additional reflector having an axial section shaped in a partially round shape, and wherein said light source is positioned at a focal point of the axial section of said additional reflector.

27. The solar simulator as claimed in claim 26, wherein a slit is formed in a part on a side of said low-angle light-diffusion optical element of said additional reflector.

28. The solar simulator as claimed in claim 25, wherein said optical reflection element comprises a reflective surface near said light source, said reflective surface having an axial section formed in a shape of two sides of a triangle projecting toward said light source.

* * * * *